US007978178B2

(12) United States Patent
Pehlivan et al.

(10) Patent No.: US 7,978,178 B2
(45) Date of Patent: Jul. 12, 2011

(54) REMOTE CONTROL

(75) Inventors: Armin Pehlivan, Nuziders (AT); Clemens Maier, St. Gallenkirch (AT)

(73) Assignee: Beckhoff Automation GmbH, Verl (DE)

( * ) Notice: Subject to any disclaimer, the term of this patent is extended or adjusted under 35 U.S.C. 154(b) by 0 days.

(21) Appl. No.: 12/914,700

(22) Filed: Oct. 28, 2010

(65) Prior Publication Data

US 2011/0095978 A1 Apr. 28, 2011

Related U.S. Application Data

(63) Continuation of application No. PCT/EP2009/053896, filed on Apr. 1, 2009.

(30) Foreign Application Priority Data

Apr. 28, 2008 (DE) ......................... 10 2008 021 160

(51) Int. Cl.
*G09G 5/00* (2006.01)
*H04N 7/00* (2011.01)

(52) U.S. Cl. ........... 345/169; 345/156; 348/114; 341/22

(58) Field of Classification Search .................. 345/156, 345/168, 169, 173–181
See application file for complete search history.

(56) References Cited

U.S. PATENT DOCUMENTS 7,202,861 B2 * 4/2007 Lynggaard .................... 345/179
7,532,224 B2 * 5/2009 Bannai .......................... 345/633
7,714,895 B2 * 5/2010 Pretlove et al. ............ 348/211.2
2005/0225453 A1 10/2005 Chang et al.
2006/0241864 A1 10/2006 Rosenberg

FOREIGN PATENT DOCUMENTS

DE 10 2005 046 218 A1 4/2007
WO WO 02/43023 5/2002

* cited by examiner

*Primary Examiner* — Duc Q Dinh
(74) *Attorney, Agent, or Firm* — Dorsey & Whitney LLP

(57) ABSTRACT

In a method for controlling objects, objects to be controlled are arranged in a real space. Said real space is linked to a multi-dimensional representational space by a transformation rule. Representations in the representational space are associated with the controllable objects of the real space by a mapping. Said method comprises steps of determining the position and orientation of a pointer in the real space, determining the position and orientation of a pointer representation associated with the pointer in the representational space using the position and orientation of the pointer in the real space and the transformation rule between the real space and the representational space, determining the representations in the representational space that are intersected by the pointer representation, selecting a representation that is intersected by the pointer representation, and controlling the object in the real space that is associated with the pointer representation in the representational space.

25 Claims, 13 Drawing Sheets

REMOTE CONTROL

CROSS-REFERENCE TO RELATED APPLICATIONS

This application is a continuation of International Patent Application No. PCT/EP2009/053896, filed on Apr. 1, 2009, which claims priority to German Application No. 10 2008 021 160.5-55, filed on Apr. 28, 2008, the entire contents of both of which are incorporated herein by reference.

BACKGROUND

The present invention relates to devices and methods for controlling objects. In the field of home electronics, remote controls for controlling electronic devices are well-known. Many electronic devices typically to be found in households are nowadays equipped with remote controls. The remote controls allow for switching on, switching off or changing a setting of the associated electronic device. In the industrial field, the use of remote controls for controlling and monitoring facilities is also known.

Typically, each device is assigned its own remote control. Therefore, in environments with many remote-controllable devices and facilities, a large number of remote controls is required. The remote controls assigned to different devices and facilities thereby often comprise operational concepts differing from one another. This forces the user of the remote controls to become familiar with a number of different operational concepts.

For controlling remote-controllable devices and facilities, conventional remote controls generally send control signals to the device or the facility to be controlled. For this purpose, the remote control establishes a direct communication connection with the device or the facility to be controlled. Typically, this communication connection is an infrared data connection. The remote control sends infrared signals in which the desired control command is encoded to the device to be controlled. The limited operating range of the infrared signals and the necessity of a direct line of sight between the remote control and the device or the facility to be controlled are disadvantages of the data exchange via infrared signal.

Document WO 02/43023 A2 describes a remote control which together with a control unit may control a plurality of devices. The spatial coordinates of all devices to be controlled are stored in the control unit. The remote control comprises means for determining the spatial position and orientation of the remote control. By means of these data, the control unit detects whether the remote control points at one of the controllable devices and, as the case may be, selects this device for controlling.

Document DE 10 2005 046 218 A1 also describes a remote-control system for controlling a plurality of devices. Here as well, a control unit is provided which stores the spatial coordinates of all controllable devices. Again, the position and orientation of the remote control are determined in order to detect which device the remote control is pointed at. The spatial coordinates of the controllable devices may alternatively be stored in the remote control itself.

Document US 2005/0225453 describes a remote-control system for controlling a plurality of devices. Here as well, a control unit is provided which stores the spatial coordinates of all controllable devices. Here again, the position and alignment of the remote control are recorded in order to detect at which device the remote control is aimed. The selected device may be controlled by means of gestures executed with the remote control.

In all three documents, the remote control must be pointed at the device coordinates stored in the respective control unit. This may turn out to be uncomfortable. For very small, distant or hidden devices, pointing the remote control precisely enough may be difficult. This is even more the case if the devices to be controlled are located out of sight or in another room or building.

Furthermore, the dependence on the spatial coordinates of the devices to be controlled limits the flexibility of the proposals made up to now. There are no possibilities provided for controlling groups of devices commonly or for offering predefined complex control sequences in a comfortably accessible manner.

Document US 2006/0241864 describes a remote-control system for controlling a plurality of devices. The spatial coordinates of all controllable objects are stored. Furthermore, it is possible to associate certain spatial coordinates with devices which are in fact at another place. A device to be controlled is selected by aligning the remote control to the device or by bringing the remote control in its vicinity. This suggestion thus facilitates the selection of small devices or devices which are arranged in a concealed manner. However, no possibility is provided for commonly controlling a group of devices or for offering predefined complex control sequences in a comfortably accessible manner.

SUMMARY

Thus, an object of the present invention is to provide an improved method for controlling objects which allows for controlling a plurality of objects with only one pointer. It is a further object of the present invention to provide a method for controlling objects that requires no direct line of sight between the pointer and the controllable object. It is a further object of the present invention to simplify the controlling of objects.

These objects are addressed by a method for controlling objects in accordance with the present invention, wherein the method involves a real space linked to a multi-dimensional representational space by an alterable transformation rule. The representations in the representational space are associated with the objects to be controlled by an alterable mapping. In order to control the objects arranged in the real space, the method may include detecting a position and orientation of a pointer in the real space and determining the position and orientation of an associated pointer representation based on the pointer's position and the transformation rule between real space and representational space. The method may further include determining the representations in the representational space which are intersected by the pointer representation, and selecting a representation which is intersected by the pointer representation. In some examples, the method may also include controlling the object in the real space which is associated with the pointer representation in the representational space.

In some embodiments, a setting representation may also be arranged in the representational space, where one or multiple setting values of one or multiple objects are associated with the setting representation. In order to set the one or multiple objects to the one or multiple setting values, the method may provide for detecting the position and orientation of the pointer in the real space, determining the position and orientation of the pointer representation associated with the pointer in the representational space by the position and orientation of the pointer in the real space and the transformation rule between real space and representational space, and selecting the setting representation and transmitting the one or multiple setting values to the one or multiple objects if the setting representation is intersected by the pointer representation.

In another embodiment of the present invention, a method for controlling objects involves objects to be controlled arranged in a real space. The real space is linked to a multi-dimensional representational space by a transformation rule. Representations in the representational space are associated with the controllable objects of the real space by a mapping. The method comprises the steps of determining the position and orientation of a pointer in the real space, determining the position and orientation of a pointer representation associated with the pointer in the representational space using the position and orientation of the pointer in the real space and the transformation rule between the real space and the representational space, determining the representations in the representational space that are intersected by the pointer representation, selecting a representation that is intersected by the pointer representation, and controlling the object in the real space that is associated with the pointer representation in the representational space.

The present invention is now described in more detail with reference to embodiments thereof and to the accompanying drawings.

DETAILED DESCRIPTION

Embodiments of the present invention, including preferred embodiments, have been presented for the purpose of illustration and description. They are not intended to be exhaustive or to limit the invention to the precise forms and steps disclosed. The embodiments were chosen and described to illustrate the principles of the invention and the practical application thereof, and to enable one of ordinary skill in the art to utilize the invention in various embodiments and with various modifications as are suited to the particular use contemplated. All such modifications and variations are within the scope of the invention as determined by the appended claims when interpreted in accordance with the breadth they are fairly, legally, and equitably entitled.

Figure 1:
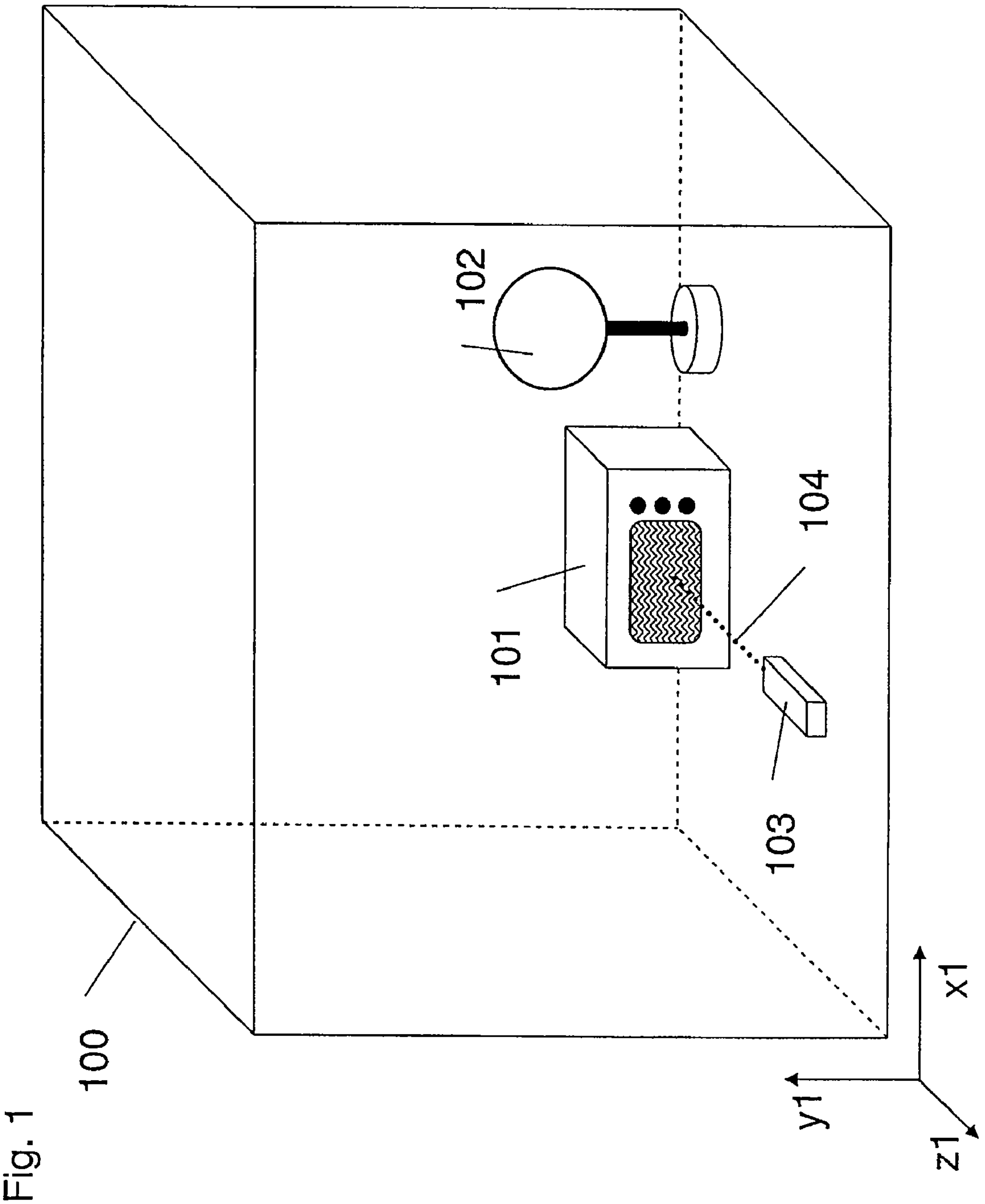
FIG. 1 shows a schematic view of a real space with controllable and non-controllable objects and a pointer.

FIG. 1 shows a schematic view of a real space 100. The real space may e.g. be a room in a building, such as an apartment or a factory. The real space 100 may also be outside of a building. The real space 100 may comprise an arbitrary size. The real space 100 may also comprise multiple rooms of a building or a part of a room of a building.

A three-dimensional Cartesian coordinate system having a first axis $x_1$, a second axis $y_1$ and a third axis $z_1$ may be associated with the real space 100. The axes $x_1$, $y_1$, $z_1$ are perpendicular to each other, respectively.

A controllable object 101 is located in the real space 100. The controllable object 101 may e.g. be an electric or electronic device, such as a home-electronic device or a facility in a factory. The controllable object 101 may e.g. be a TV set. The controllable object 101 comprises setting options which may be modified by a user. In the case of a TV set, the user may e.g. set the broadcast program or the sound volume. If the controllable object 101 is a lamp, its brightness may e.g. be controlled. If the controllable object 101 is a facility in a factory, settings of this facility may be modified.

Furthermore, a non-controllable object 102 is located in the real space 100. The non-controllable object 102 may be any arbitrary object which does not provide any control for a user. The non-controllable object may e.g. be an indoor plant, a sign attached to a wall or a non-controllable facility of a factory.

The real space 100 may, apart from the depicted controllable object 101 and the depicted non-controllable object 102, comprise any arbitrary number of further controllable and non-controllable objects. The controllable and non-controllable objects may be arranged within the real space in any arbitrary manner. If the real space 100 comprises multiple rooms or building parts of a building, the controllable and non-controllable objects may be arranged in different rooms or building parts of the real space 100.

FIG. 1 further shows a pointer 103 arranged in the real space. The pointer 103 serves for controlling the controllable object 101 and further controllable objects of the real space 100. The pointer 103 may comprise the shape of a remote control as it is e.g. known for TV sets. The pointer 103 may also comprise the shape of a mobile phone or any other arbitrary shape. In the depiction of FIG. 1, the pointer 103 is a device which may be moved freely in the real space 100. The pointer 103 may comprise the shape of a remote control. Thus, users who are used to using a remote control do not have to re-accustom.

At each point in the real space 100, the pointer 103 comprises a position which may be indicated with reference to the coordinate axes $x_1$, $y_1$, $z_1$. Additionally, the pointer 103 may be rotated around arbitrary axes. At each point in time, the pointer 103 comprises an orientation within the real space 100 which may e.g. be expressed by a direction vector which may be indicated in units of the coordinate axes $x_1$, $y_1$, $z_1$. In FIG. 1, a line of sight 104 is shown which indicates the orientation of the pointer 103. In the example of FIG. 1, the line of sight 104 is perpendicular to an outer surface of the pointer 103. If the pointer 103 comprises the shape of a remote control, the line of sight 104 may e.g. be perpendicular to a front surface of the pointer 103. In FIG. 1, the pointer 103 is orientated such that the line of sight 103 is orientated in the direction of the controllable object 101. This complies with the intuitive use of a conventional remote control which serves for controlling the controllable object 101.

Figure 2:
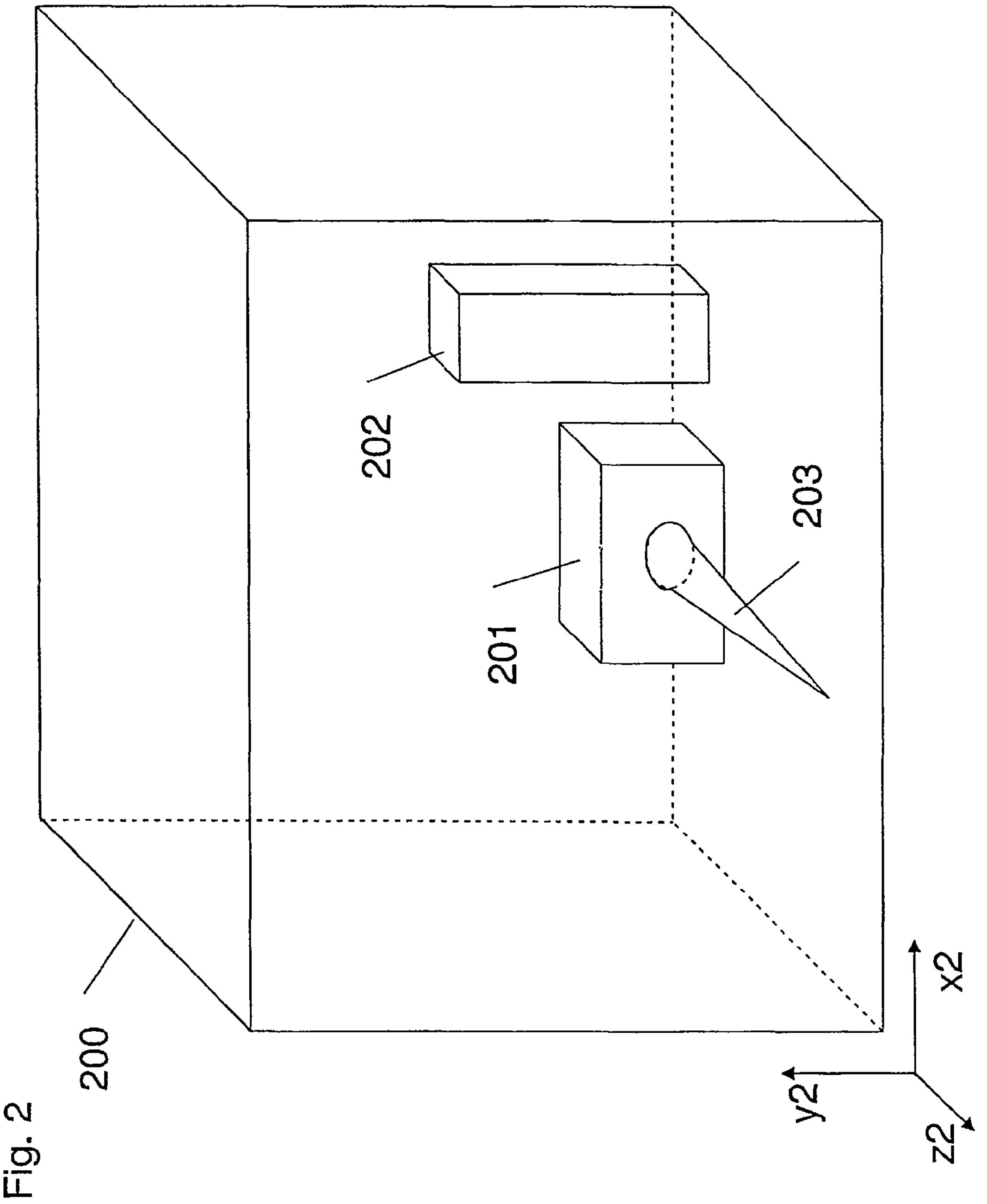
FIG. 2 shows a schematic view of a representational space with a representation, a settings representation and a pointer representation.

FIG. 2 shows a schematic view of a representational space 200 linked to the real space 100. The representational space 200 may be a one-, two- or three-dimensional representational space. In the depiction of FIG. 2, the representational space 200 is a three-dimensional representational space having a Cartesian coordinate system with the axes $x_2$, $y_2$, $z_2$ which are perpendicular to each other, respectively. The representational space 200 is linked to the real space 100 via a transformation rule. The transformation rule may be understood as a transformation between the Cartesian coordinate system with the axes $x_1$, $y_1$, $z_1$ of the real space 100 and the Cartesian coordinate system with the axes $x_2$, $y_2$, $z_2$ of the representational space 200. The transformation rule may e.g. be a linear map. The transformation rule may comprise a translation, a rotation and an enlargement or a diminishment. The transformation rule may also comprise any arbitrary other mathematical operations or transformation rules. In a simple case, the transformation rule between real space 100 and representational space 200 is an identity map. In this case, real space 100 and representational space 200 overlay each other in a congruent manner.

The representational space 200 may comprise any arbitrary extension. The representational space 200 may be larger, smaller or equal to the real space 100.

In the representational space 200, a representation 201 is arranged. The representation 201 may be associated with the controllable object 101 of the real space 100 by a mapping. Various alterable mapping or plotting techniques may be used to define representation locations within the representational space. The representation 201 may be arranged at various positions within the representational space 200 and may comprise various sizes and orientations within the representational space 200. If the representational space 200 congruently overlays the real space 100, the representation 201 may be arranged at the same position within the representational space 200 at which the controllable object 101 which is associated with the representation 201 is arranged in the real space 100. In this case, the representation 201 may comprise a shape which is similar to the shape of the controllable object 101 and comprise a similar size as the controllable object 101. The controllable object 101 which is arranged in the real space 100 may comprise a complex geometry. In this case, the shape of the representation 201 may be simplified. If the controllable object 101 is a TV set, a cuboid-shaped representation 201 in the representational space 200 may e.g. be associated with the controllable object 101.

FIG. 2 further shows a pointer representation 203 arranged in the representational space 200. The pointer representation 203 in the representational space 200 may be associated with the pointer 103 in the real space 100 by a mapping. According to the transformation rule of the representational space 200 and the real space 100, the position and orientation of the pointer representation 203 in the representational space 200 correspond to the position and orientation of the pointer 103 in the real space 100.

In the depicted example of FIG. 2, the pointer representation 203 comprises the shape of a cone. The pointer representation 203 may also have any arbitrary other shape, such as the shape of a cylinder, a pyramid, a cuboid, a tetrahedron, a prism, a straight line or a fan-shaped line bundle or any other geometrical shape.

In the example of FIG. 2, the tip of the cone-shaped pointer representation 203 is at the position of the representational space 200 which is linked to the position of the pointer 103 in the real space 100 by the transformation rule between representational space 200 and real space 100. In FIG. 1, a line of sight 104 which is perpendicular to a surface of the pointer 103 is pointed at the controllable object 101 of the real space 100. Correspondingly, the pointer representation 203 in FIG. 2 intersects the representation 201. In the examples shown in FIGS. 1 and 2, the transformation rule between real space 100 and representational space 200 and the mapping between the controllable object 101 and the representation 201 are selected such that the pointer representation 203 intersects the representation 201 when a line of sight 104 which is perpendicular to a surface of the pointer 103 is pointed at the controllable object 101 of the real space 100. The transformation rule and the mapping, however, might in other embodiments also be selected such that the pointer representation 203 does not intersect the representation 201 when the pointer 103 is pointed at the controllable object 101. Instead, the pointer representation 203 might intersect the representation 201 at another orientation of the pointer 103 in the real space 100.

The representational space 200 depicted in FIG. 2 additionally comprises a settings representation 202. The settings representation 202 is not associated with any object of the real space 100 of FIG. 1. The settings representation 202 represents a set of setting values for one or multiple controllable objects of the real space 100. The settings representation 202 may e.g. represent one or multiple setting values for the controllable object 101 of FIG. 1. The settings representation 202 is at the position of the representational space 200 which is linked to the position of the non-controllable object 102 in the real space 100 of FIG. 1. As a consequence, the pointer representation 203 intersects the setting representation 202 in the representational space 200 when the pointer 103 in the linked real space 100 of FIG. 1 is pointed at the non-controllable object 102. The settings representation 202, however, might also be arranged at any other arbitrary position within the representational space 200. The representational space 200 might also comprise further settings representations. The settings representation 202 may also be omitted.

The setting representation makes it possible to store and again access sets of settings belonging together for various controllable objects. Thus, recurrent scenarios may be considered and settings of various controllable objects do not have to be entered anew each time.

Figure 3:
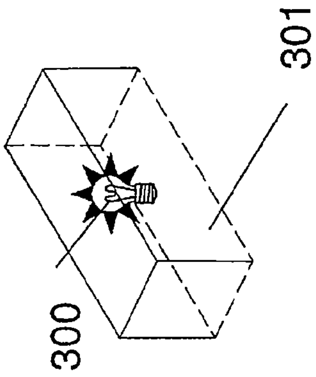
FIG. 3 shows a schematic view of an object and an associated representation.

FIG. 3 further clarifies the connection between a controllable object 300 arranged in a real space and a representation 301 arranged in a representational space which is linked to the real space. The controllable object may e.g. be a lamp having an adjustable brightness or a stereo having an adjustable sound volume. The representation 301 may be associated with the object 300 by a mapping. The representation 301 may comprise the same geometry as the object 300. The representation 301 may, however, also comprise a different geometry than the object 300. The geometry of the representation 301 may e.g. be simplified with respect to the geometry of the object 300. The representation 301 may be at a position in the representational space which is linked to the position of the object 300 in the real space. The representation 301 may, however, also be at another position of the representational space. In the example depicted in FIG. 3, the representation 301 is associated with the object 300 and the object 300 is associated with the representation 301.

Figure 4:
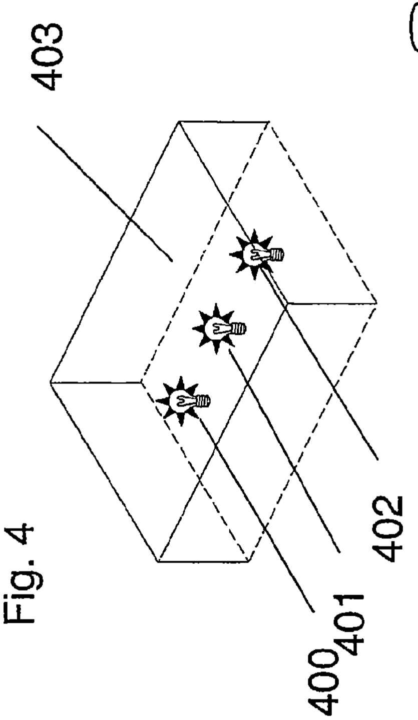
FIG. 4 shows a schematic view of a plurality of objects with an associated representation.

In FIG. 4, three controllable objects 400, 401, 402 arranged in a real space are schematically depicted. The controllable objects 400, 401, 402 arranged in the real space may e.g. be three lamps comprising an adjustable brightness. A representation 403 is associated with the three controllable objects 400, 401, 402, and may be arranged in the real space by a mapping, the representation 403 being arranged in a representational space which may be linked to the real space by a transformation rule. Thus, a common representation 403 is associated with the three controllable objects 400, 401, 402 depicted in the example of FIG. 4. Three controllable objects 400, 401, 402 are associated with the representation 403.

Figure 5:
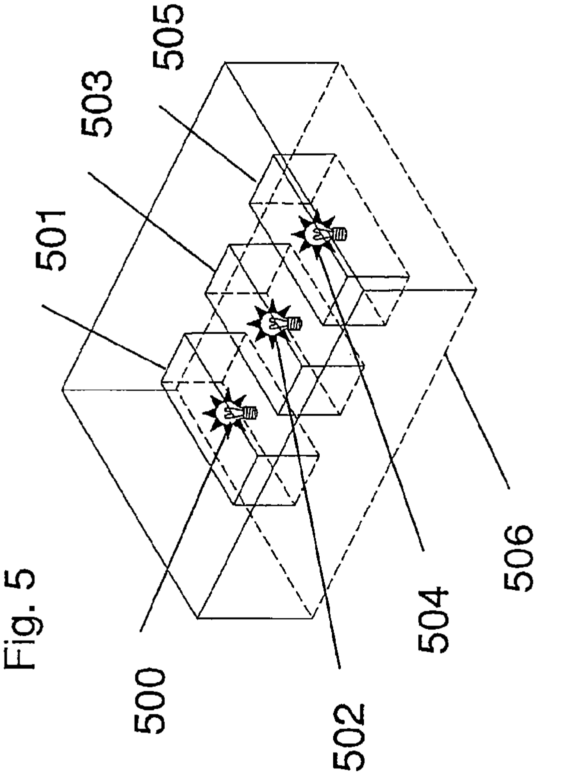
FIG. 5 shows a schematic view of a plurality of objects with associated representations.

FIG. 5 shows a schematic view of three objects 500, 502, 504 arranged in a real space. The controllable objects 500, 502, 504 may e.g. be lamps comprising an adjustable brightness. Representations 501, 503, 505 arranged in a representational space which may be linked to the real space by a transformation rule are associated with the objects 500, 502, 504, and may be arranged in the real space by a mapping. The representation 501 is associated with the object 500. The representation 503 is associated with the object 502. The representation 505 is associated with the object 504. Each of the objects 500, 502, 504 is thus associated with one of the representations 501, 503, 505. Each of the representations 501, 503, 505 is associated with one of the objects 500, 502, 504.

The representations 501, 503, 505 are arranged within a further representation 506 in the representational space. The representations 501, 503, 505 are thus combined or grouped to form the representation 506 in the representational space. Each of the objects 500, 502, 504 arranged in the real space is thus also associated with the representation 506 in the representational space. The representation 506 in the representational space is associated with each of the objects 500, 502, 506 in the real space. The object 500 in the real space is associated with both the representation 501 and the representation 506 in the representational space. The object 502 in the real space is associated both with the representation 503 and with the representation 506 in the representational space. The object 504 is associated both with the representation 505 and with the representation 506 in the representational space.

Figure 6:
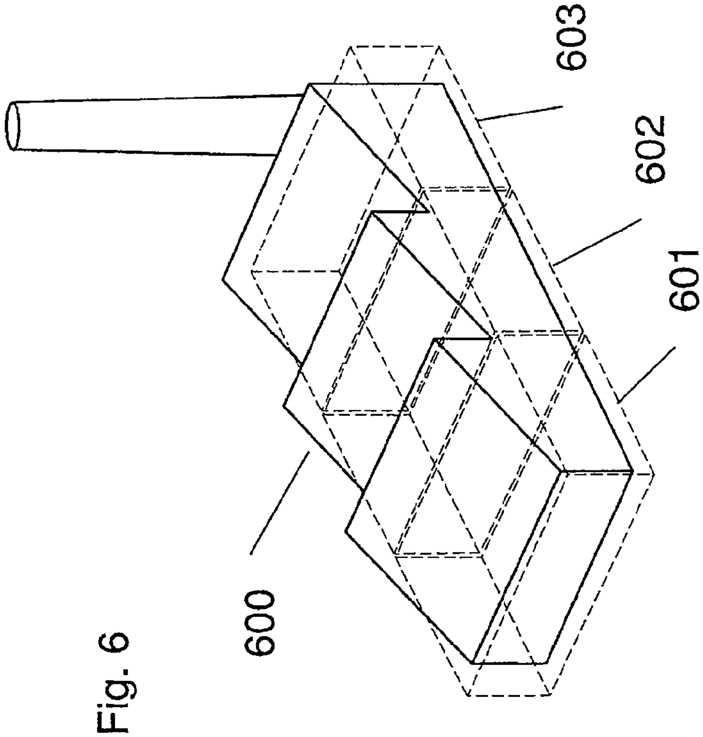
FIG. 6 shows a schematic view of an object having a plurality of associated representations.

In FIG. 6, a controllable object 600 arranged in a real space is schematically depicted. The controllable object may e.g. be a factory. Three representations 601, 602, 603 arranged in the representational space which may be linked to the real space by a transformation rule may be associated with the controllable object 600 arranged in the real space by a mapping. Thus, in the example depicted in FIG. 6, multiple representations 601, 602, 603 in the linked representational space are associated with a controllable object in the real space. In the same way as shown in FIG. 5, the representations 601, 602, 603 depicted in FIG. 6 may comprise further representations which are not shown in FIG. 6.

Figure 7:
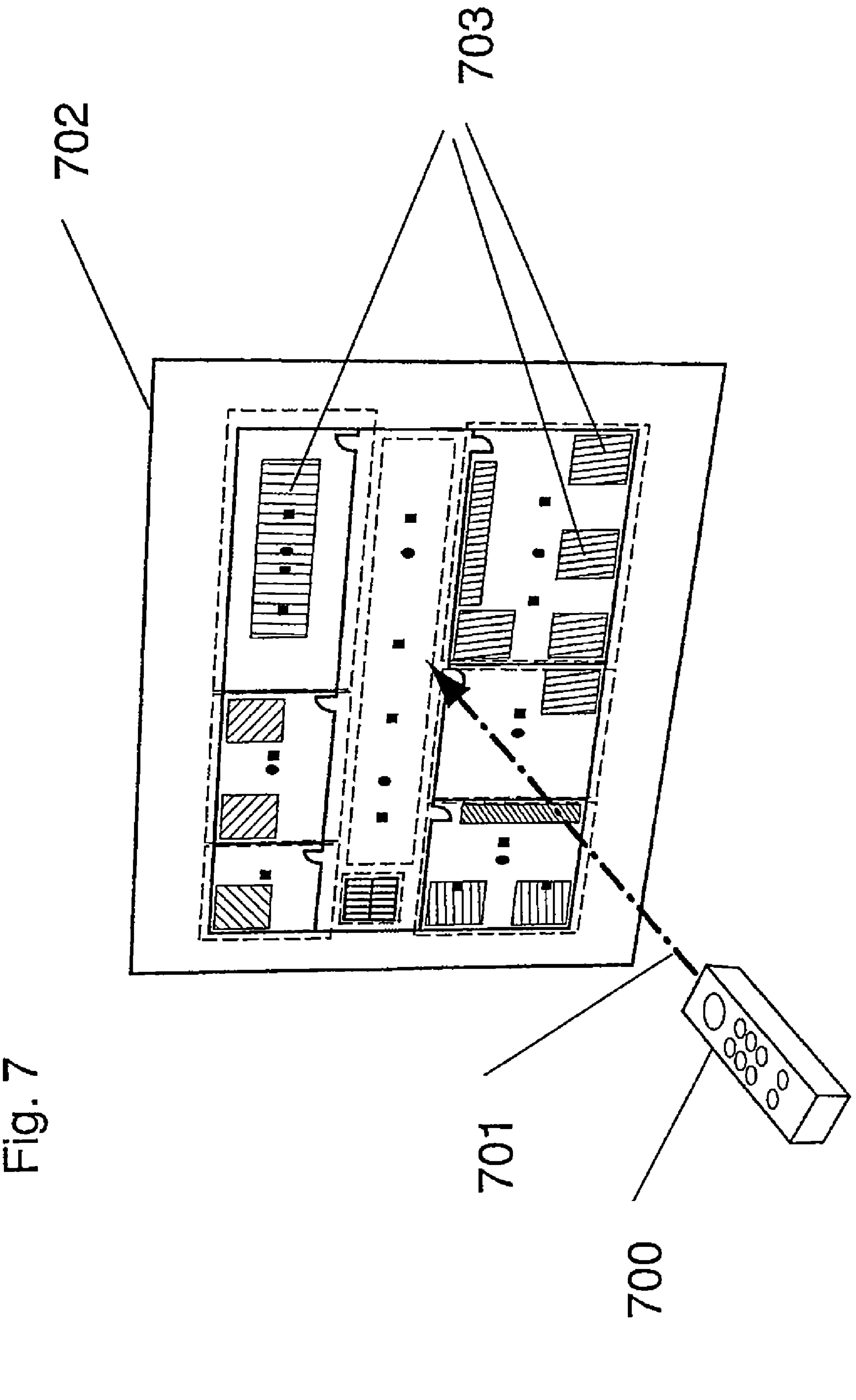
FIG. 7 shows a schematic view of a building layout having a plurality of two-dimensional representations.

FIG. 7 shows a schematic view of a building layout 702. The building layout 702 depicts a building with controllable objects in it. The building depicted in the building layout 702 may e.g. be an office building with controllable objects in it. The controllable objects arranged in the office building may e.g. be lamps, air-conditioning systems, speakers, sunblinds, computers or other controllable devices.

The building layout 702 is arranged in a real space. The building layout 702 may e.g. be arranged on a wall of the building depicted in the building layout 702. The real space in which the building plan 702 is arranged may be linked to a representational space by a transformation rule. The representations 703 which are arranged in the representational space are associated with the controllable objects which may be depicted in the building layout 702 by a mapping. The representations 703 are two-dimensional representations. The two-dimensional representations 703 are arranged in the representational space in such a way that the position of the representation 703 in the representational space is by the transformation rule between representational space and real space linked to a position in the real space which is located on the building layout 702 arranged in the real space. The representation 703 can be found at the position in the representational space at which the controllable object in the real space associated with the representation 703 is depicted in the building layout 702. If a pointer 700 in the real space is orientated such that a line of sight 701 which is perpendicular to a surface of the pointer 700 intersects an image of a controllable object in the building layout 702, a pointer representation associated with the pointer 700 in the representational space linked to the real space intersects a representation 703 associated with the intersected controllable object. The building layout 702 arranged in the real space thus allows for a simple and comfortable selection of all controllable objects arranged in different building parts.

Figure 8:
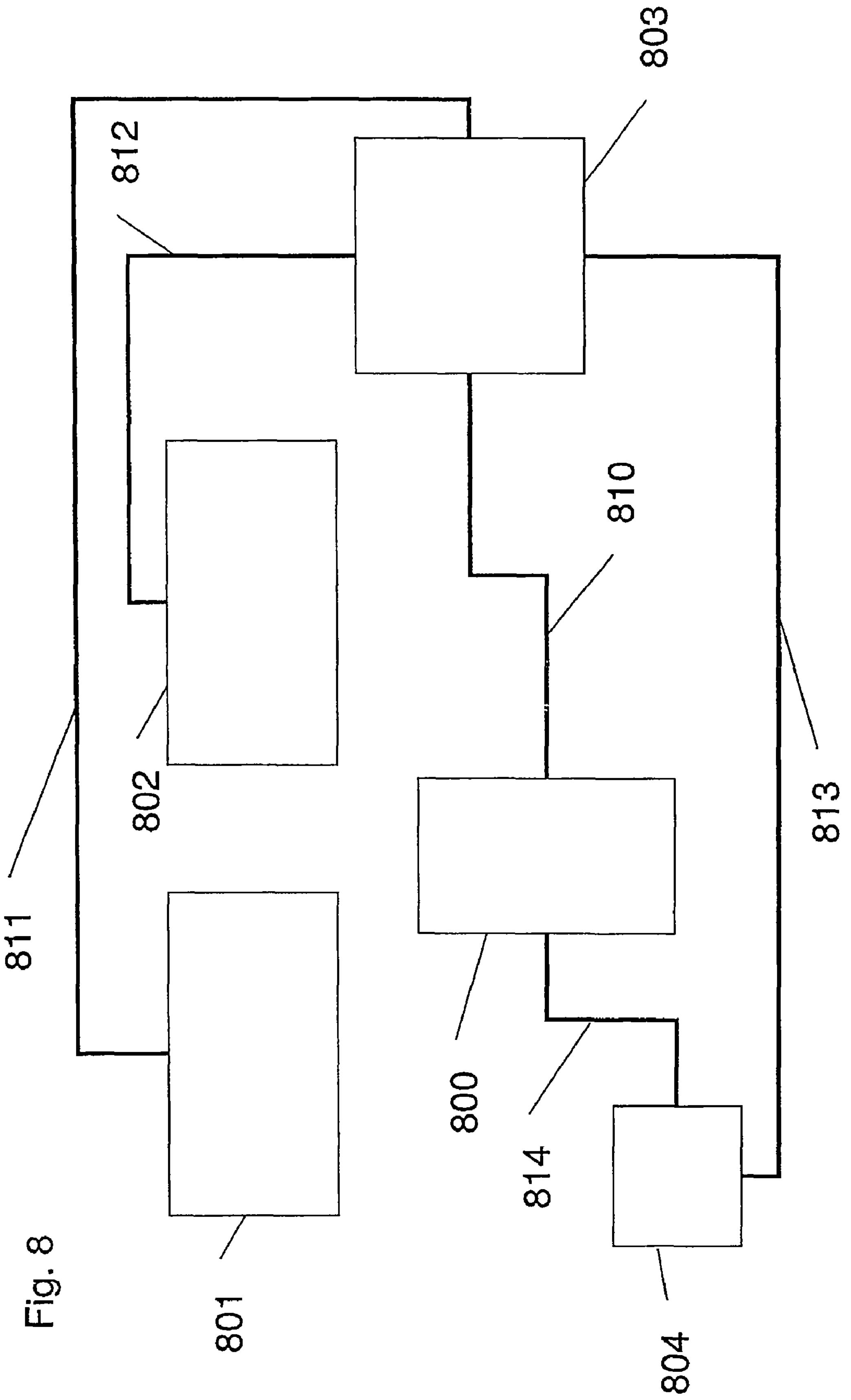
FIG. 8 shows a schematic view of a control device which is connected to two objects, a pointer and a position-detecting device.

In FIG. 8, a schematic block diagram of an arrangement for controlling one or more controllable objects is depicted. FIG. 8 shows a pointer 800 which may be used for controlling a first controllable object 801 and a second controllable object 802. The pointer 800 may be connected to a control device 803 by a communication connection 810. The control device 803 may e.g. be a computer. The communication connection 810 may be a wire-connected or a wireless communication connection 810. The communication connection 810 may be a known wireless communication connection such as a Bluetooth connection or a WLAN connection. The control device 803 may be connected to the first controllable object 801 by a first control connection 811. The control device 803 may be connected to the second controllable object 802 by a second control connection 812. The control connections 811, 812 may be wire-connected or wireless control connections. The control connections 811, 812 may e.g. be infrared control connections. In this case, already-existing interfaces of the controllable objects 801, 802 may potentially be used for the control connections 811, 812, the interfaces being provided for controlling the controllable objects 801, 802 by a conventional remote control.

When the pointer is connected to a control device, there may or may not be direct communication between the pointer and the controllable object. Thus, communication may occur without line of sight between the object and the pointer and controlling may be carried out independently from the distance between object and pointer.

The block diagram of FIG. 8 further shows a position-detecting device 804. The position-detecting device 804 may be connected to the control device 803 by a data connection 813. The controllable objects 801, 802, the control device

803, the pointer 800 and the position-detecting device 804 are arranged in a real space. The position-detecting device 804 may detect the position and orientation of the pointer 800 in the real space by a position identification 814. The position-detecting device 804 communicates the detected position and orientation of the pointer 800 to the control device 803 with a data connection 813. The data connection 813 may be a wire-connected or a wireless data connection.

The control device 803 may determine which of the representations arranged in the representational space is intersected by the pointer representation in the representational space which is associated with the pointer 800 by a detected position and orientation of the pointer, by a transformation rule between real space and representational space which is stored in the control device 803, and by a mapping stored in the control device 803 which serves for associating controllable objects 801, 802 arranged in the real space with representations arranged in the representational space. Subsequently, the control device 803 determines the controllable object 801, 802 of the real space associated with the intersected representation. If the pointer representation in the representational space intersects more than one representation, the control device 803 allows for selecting a certain representation according to a method which will be explained below.

By means of the communication connection 810, the control device 803 communicates to the pointer 800 which controllable object 801, 802 is associated with the selected intersected representation. The pointer 800 may communicate the selected controllable object 801, 802 to the user of the pointer 800 by means of e.g. a screen. If the pointer representation associated with the pointer 800 intersects the representation associated with the first controllable object 801, the pointer 800 communicates to the user that the first controllable object 801 has been selected. The user of the pointer 800 may then enter control commands for the first controllable object 801 by means of operating devices of the pointer 800. The pointer 800 transmits the entered control commands to the control device 803 via the communication connection 810. The control device 803 transmits the entered control commands to the first controllable object 801 via the first control connection 811. The first controllable object 801 carries out the entered control commands. The first controllable object 801 may also send a response to the control command to the control device 803 via the first control connection 811. The control device 803 transmits the response to the pointer 800 via the communication connection 810. The pointer 800 may display the response of the first controllable object 801 on its screen.

Figure 9:
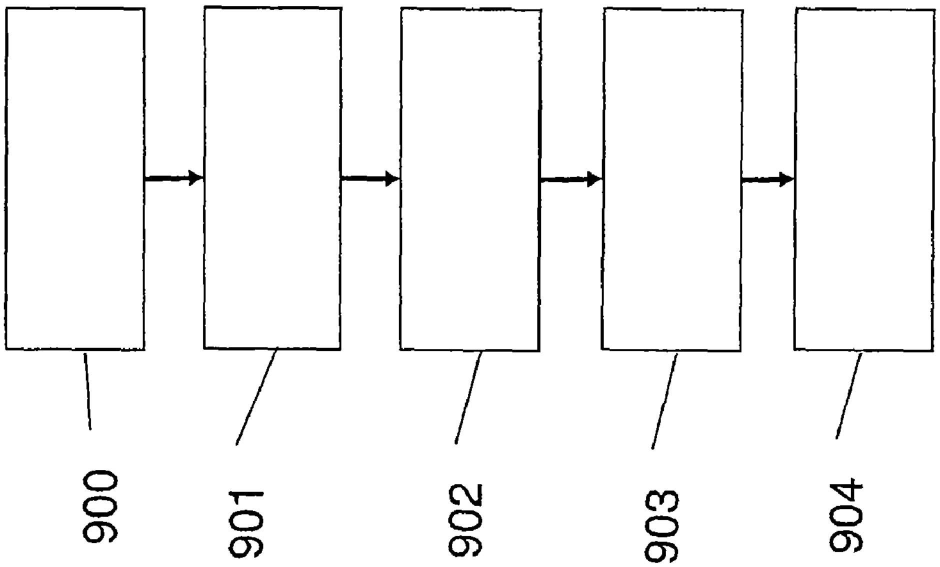
FIG. 9 shows a schematic flow diagram of a method for controlling objects.

In FIG. 9, the described method for controlling objects may be schematically depicted by a flow diagram. In a first process step 900, position and orientation of a pointer in a real space are determined. Position and orientation of the pointer in the real space may e.g. be determined by a position-detecting device which will be explained in more detail below.

In a second process step 901, position and orientation of a pointer representation in the representational space, the pointer representation being associated with the pointer, may be determined by the position and orientation of the pointer in the real space and by a transformation rule between real space and representational space.

In a third process step 902, the representations arranged in the representational space which are intersected by the pointer representation are determined.

In a fourth process step 903, one of the representations of the representational space which has been determined in the previous process step 902 and which is intersected by the pointer representation is selected. The selection may be carried out automatically by a criteria described below or manually by a user.

In a fifth process step 904, the controllable object in the real space associated with the representation selected in the fourth process step 903 is determined. Subsequently, this object of the real space is controlled.

Advantageously, the described method allows for controlling a plurality of objects with only one pointer. Therein, no direct visual contact between the pointer and the controllable object is needed. Advantageously, the selection of a controllable object may intuitively be effected by pointing to an object with the pointer.

Figure 10:
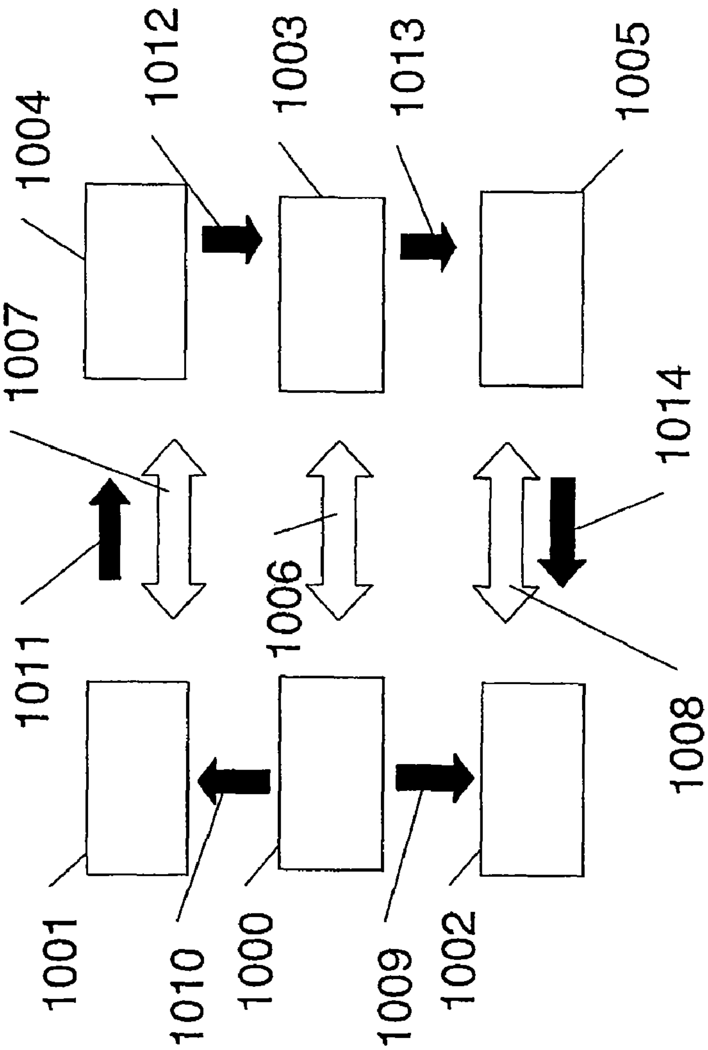
FIG. 10 shows a schematic view of a method for controlling objects.

In FIG. 10, the relations between real space 1001, representational space 1004, pointer 1000, pointer representation 1003, object 1002 and representation 1005 are schematically depicted. A real space 1001 is linked to a representational space 1004 by means of a transformation rule 1007. The transformation rule 1007 connects a coordinate system of the real space 1001 with a coordinate system of the representational space 1004.

A pointer representation 1003 is associated with a pointer 1000 via a mapping 1006. The mapping 1006 indicates the relation between position and orientation of the pointer 1000 in the real space 1001 and position and orientation of the pointer representation 1003 in the representational space 1004. The mapping 1006 also indicates the size and shape of the pointer representation 1003.

A representation 1005 is associated with the controllable object 1002 via a mapping 1008. The mapping 1008 indicates the size and shape of the representation 1005 and its position in the representational space 1004.

The pointer 1000 and the controllable object 1002 are arranged in the real space 1001. The pointer representation 1003 and the representation 1005 are arranged in the representational space 1004.

When the controllable object 1002 is to be controlled, the pointer 1000 takes up a determined orientation 1009 with respect to the object 1002. In a simple embodiment, the pointer 1000 is e.g. pointed at the object 1002. A position and an orientation 1010 of the pointer 1000 in the real space 1001 are determined via a position-detecting device. By means of a transformation rule 1011, the position and orientation 1010 of the pointer 1000 in the real space 1001 are converted into a position and orientation 1012 of the pointer representation 1003 in the representational space 1004. From this, an intersection 1013 of the pointer representation 1003 with the representation 1005 is detected. Via a transformation rule 1014, it is inferred from the intersected representation 1005 to the controllable object 1002. Subsequently, the controllable object 1002 may be controlled.

The described method requires a transformation rule between real space and representational space and a mapping between controllable objects and associated representations.

Figure 11:
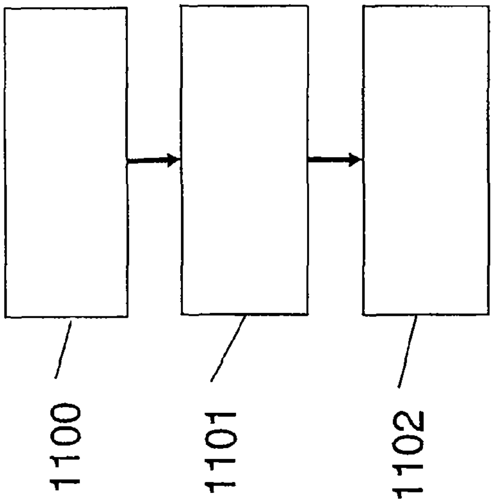
FIG. 11 shows a schematic flow diagram of a method for defining a representational space.

A method for defining representational space, transformation rule and mapping is schematically depicted in FIG. 11 by a flow diagram.

In a first process step 1100, a mathematical transformation rule which links real space and representational space to each other is determined. The mathematical transformation rule maps real space and representational space to each other. The mathematical transformation rule may e.g. comprise rotations, translations and scaling. In a simple embodiment, the mathematical transformation rule maps real space and representational space in such an identical manner that real space and representational space are on top of each other in a congruent manner.

In a second process step 1101, representations are associated with the controllable objects arranged in the real space. The representations may comprise the same geometric shape as the controllable objects. The representations may as well comprise a geometric shape which is simplified with regard to the controllable objects. For example, representations in the form of simple geometric base bodies such as cuboid, sphere, cylinder and pyramid may be associated with the controllable objects. The representations may comprise a different dimensionality than the controllable objects. For example, two-dimensional representations may be associated with three-dimensional controllable objects. The extension of the representations in the representational space depends on the extension of the controllable objects in the real space. The representations in the representational space may comprise the same size as the objects in the real space. The representations may, however, also be larger or smaller than the objects.

In a third process step 1102, the representations associated with the objects to be controlled are arranged in the representational space. The representations may be arranged in the representational space in such a way that a pointing of the pointer at an object in the real space causes a pointing of the pointer representation associated with the pointer at the representation associated with the object. The representations, however, may also be arranged in other positions of the representational space. The representations may e.g., as shown in image 7, be arranged in the representational space such that an orientation of the pointer to a depiction of the object arranged in the real space causes an intersection between the pointer representation associated with the pointer and the representation arranged in the representational space.

Advantageously, a high degree of abstraction is achieved by the transformation between real space and representational space which allows for adapting the described method to a plurality of applications.

In one embodiment, the positions and sizes of the representational space and of the representations associated with the controllable objects may automatically be determined corresponding to the locations and sizes of recorded controllable objects. This facilitates the generation of a representational space associated with a real space. Advantageously, said generation may be carried out automatically to a large extent.

Figure 12:
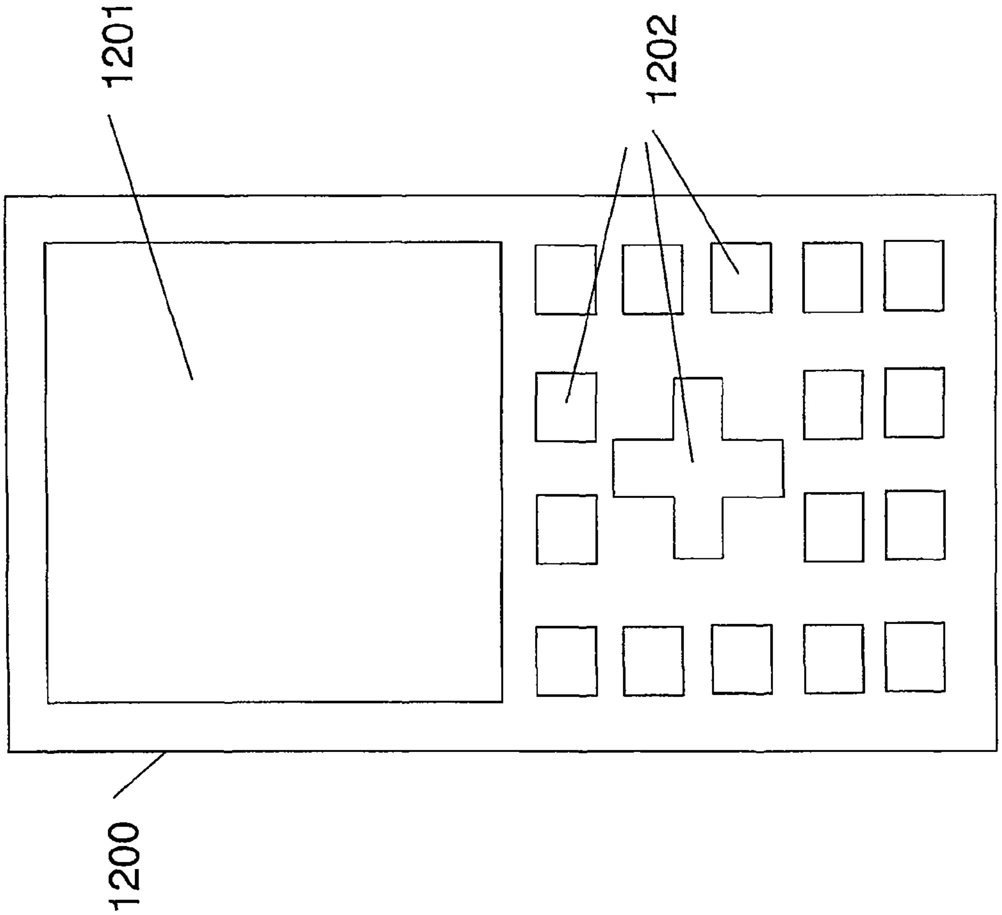
FIG. 12 shows a schematic view of a pointer.

FIG. 12 shows a schematic depiction of a pointer 1200 to be used in a method for controlling objects. The pointer 1200 comprises a screen 1201. The screen 1201 may e.g. be a liquid-crystal screen. The screen 1201 of the pointer 1200 may serve for displaying information. For example, the currently selected controllable object may be indicated on the screen 1201. In case that the pointer representation associated with the pointer 1200 intersects a plurality of representations arranged in the representational space, a list of the objects associated with the intersected pointer representations may be shown on the screen 1201. This allows the user to select one of the indicated objects. The user may e.g. make his/her selection via operation devices 1202 of the pointer 1200. In another embodiment, the screen 1201 of the pointer 1200 is a touch-sensitive screen. In this case, the user of the pointer 1200 may make his selection by touching the screen 1201. The screen 1201 may also serve for indicating information transmitted by the selected controllable object. The screen 1201 of the pointer 1200 may also show arbitrary other pieces of information.

A pointer representation in a representational space is associated with a movable pointer in the real space via a mapping.

FIGS. 13 to 18 show different embodiments of the geometric shape of a pointer representation.

Figures 13, 14, 15, 16, 17, 18:
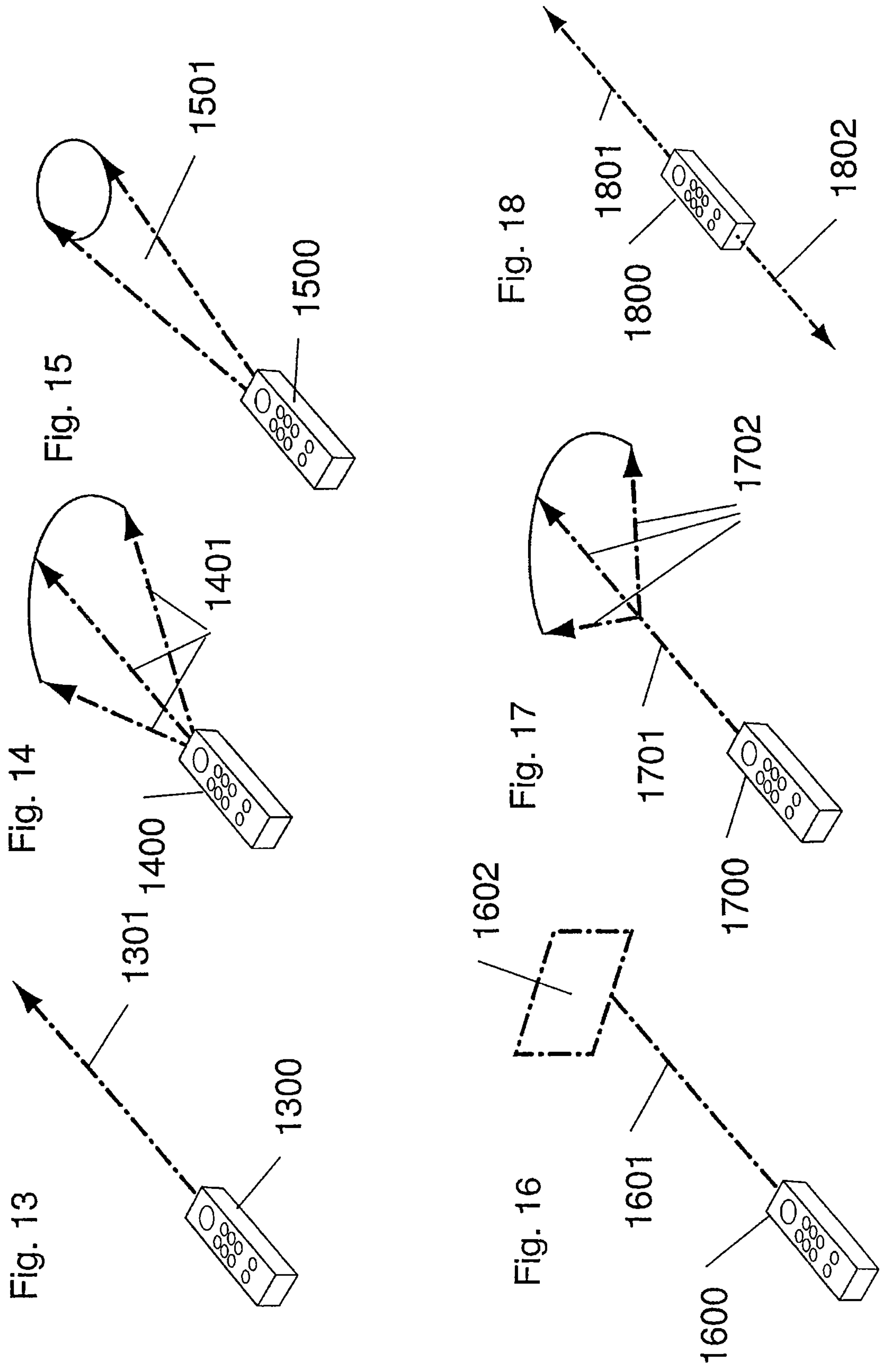
FIG. 13 shows a schematic view of a pointer having an associated pointer representation.
FIG. 14 shows a schematic view of a pointer having an associated pointer representation.
FIG. 15 shows a schematic view of a pointer having an associated pointer representation.
FIG. 16 shows a schematic view of a pointer having an associated pointer representation.
FIG. 17 shows a schematic view of a pointer having an associated pointer representation.
FIG. 18 shows a schematic view of a pointer having an associated pointer representation.

FIG. 13 shows a schematic depiction of a pointer 1300 and of the pointer representation 1301 associated with the pointer 1300. The pointer representation 1301 comprises the shape of a half-line or beam. The pointer representation 1301 extends in a linear manner from a starting point in the representational space depending on the position of the pointer 1300 in the real space into a spatial direction of the representational space depending on the orientation of the pointer 1300 in the real space. The pointer representation 1301 may comprise a determined finite length, but it may also be extended infinitely.

FIG. 14 schematically shows a pointer 1400 and a pointer representation 1401 associated with the pointer 1400 in the representational space. The pointer representation 1401 comprises the shape of a bundle of rays. The bundle of rays of the pointer representation 1401 extends in the shape of a plurality of rays beginning from a starting point in the representational space into various directions of the representational space. The individual rays of the bundle of rays of the pointer representation 1401 may lie inside a plane arranged in the representational space. In this case, the bundle of rays of the pointer representation 1401 comprises a fan-shaped design. The rays of the bundle of rays of the pointer representation 1401 may, however, also point into arbitrary other spatial directions of the representational space. The rays of the bundle of rays of the pointer representation 1401 may comprise a finite or an infinite length.

FIG. 15 shows a schematic depiction of a pointer 1500 and of a pointer representation 1501 associated with the pointer 1500 in the representational space. The pointer representation 1501 comprises the shape of a cone. The point of the cone of the pointer representation 1501 is located at a point in the representational space. Starting from this point, the cone of the pointer representation 1501 extends finitely or infinitely into a direction in the representational space which depends on the orientation of the pointer 1500 in the real space.

FIG. 16 shows a schematic depiction of a pointer 1600 and of a pointer representation in the representational space associated with the pointer 1600, the pointer representation consisting of a first part 1601 and of a second part 1602. The first part 1601 of the pointer representation is linear. Beginning from a starting point arranged in the representational space, the first part of the pointer representation 1601 extends over a determined length in a direction in the representational space which depends on the orientation of the pointer 1600 in the real space. The second part 1602 of the pointer representation comprises a rectangular shape. The second part 1602 of the pointer representation is arranged at the end of the first part 1601 in such a way that the linear first part 1601 of the pointer representation is perpendicular to the rectangular second part 1602 of the pointer representation. The second part 1602 of the pointer representation may also comprise the shape of a circle or another shape. The length of the first part 1601 of the pointer representation and the size of the second part 1602 of the pointer representation may be predetermined or it may be adjustable by the user of the pointer 1600.

FIG. 17 shows a schematic depiction of a pointer 1700 and of a pointer representation associated with the pointer 1700, the pointer representation consisting of a first part 1701 and of a second part 1702. The first part 1701 of the pointer representation extends from a starting point arranged in the representational space over a predetermined length into a direction which depends on the orientation of the pointer. The length of the first part 1701 of the pointer representation may be fixed or it may be adjustable by the user of the pointer 1700. The second part 1702 is attached to the end point of the first part

1701 of the pointer representation. The second part 1702 of the pointer representation comprises the shape of a bundle of rays. The rays of the bundle of rays of the second part 1702 of the pointer representation extend from the endpoint of the first part 1701 in various directions of the representational space in a straight manner. The rays of the bundle of rays of the second part 1702 of the pointer representation may lie in a common plane in the representational space.

FIG. 18 shows a schematic depiction of a pointer 1800 and a pointer representation associated with the pointer 1800 in the representational space, the pointer representation consisting of a first part 1801 and a second part 1802. The first part 1801 and the second part 1802 comprise the shape of half-lines pointing into opposite spatial directions in the representational space. The first part 1801 of the pointer representation in a straight manner proceeds from a starting point in the representational space which depends on the position of the pointer 1800 in the real space into a spatial direction of the representational space which depends on the orientation of the pointer 1800 in the real space. The second part 1802 of the pointer representation proceeds from the same starting point as the first part 1801 of the pointer representation; however, it extends into the opposite spatial direction of the representational space. The first part 1801 and the second part 1802 of the pointer representation may comprise a finite or an infinite length.

A pointer representation associated with the pointer may also comprise other geometric shapes. For example, the pointer representation may be designed in the shape of a cone, a cylinder, a pyramid, a cuboid, a tetrahedron, a prism, a straight line, a fan-shaped line bundle or another geometric shape.

The shape of a pointer representation associated with a pointer may be fixed. In another embodiment, the shape of the pointer representation associated with the pointer is adjustable by the user of the pointer. In a further embodiment, the shape of a pointer representation associated with the pointer is automatically selected based on predetermined criteria. The selection of the shape of the pointer representation may e.g. be effected depending on a velocity at which the pointer is moved in the real space. The shape of the pointer representation may also be effected depending on the representations intersected by the pointer representation. In the case that, for example, the pointer representation intersects a plurality of representations arranged in the representational space, the pointer representation may be reduced. The reduction may e.g. affect the second part 1602 of the pointer representation depicted in FIG. 16 or the angle of aperture of the cone-shaped pointer representation 1501 depicted in FIG. 15. The shape of the pointer representation may also change depending on the distance of a representation intersected by the pointer representation from the starting point of the pointer representation.

Also, more than one pointer representation may be associated with a pointer. The associated pointer representations may be orientated in the representational space in a different manner. The multiple pointer representations may comprise different properties. For example, it may be provided that one of the pointer representations only intersects representations in a predetermined manner.

Figure 19:
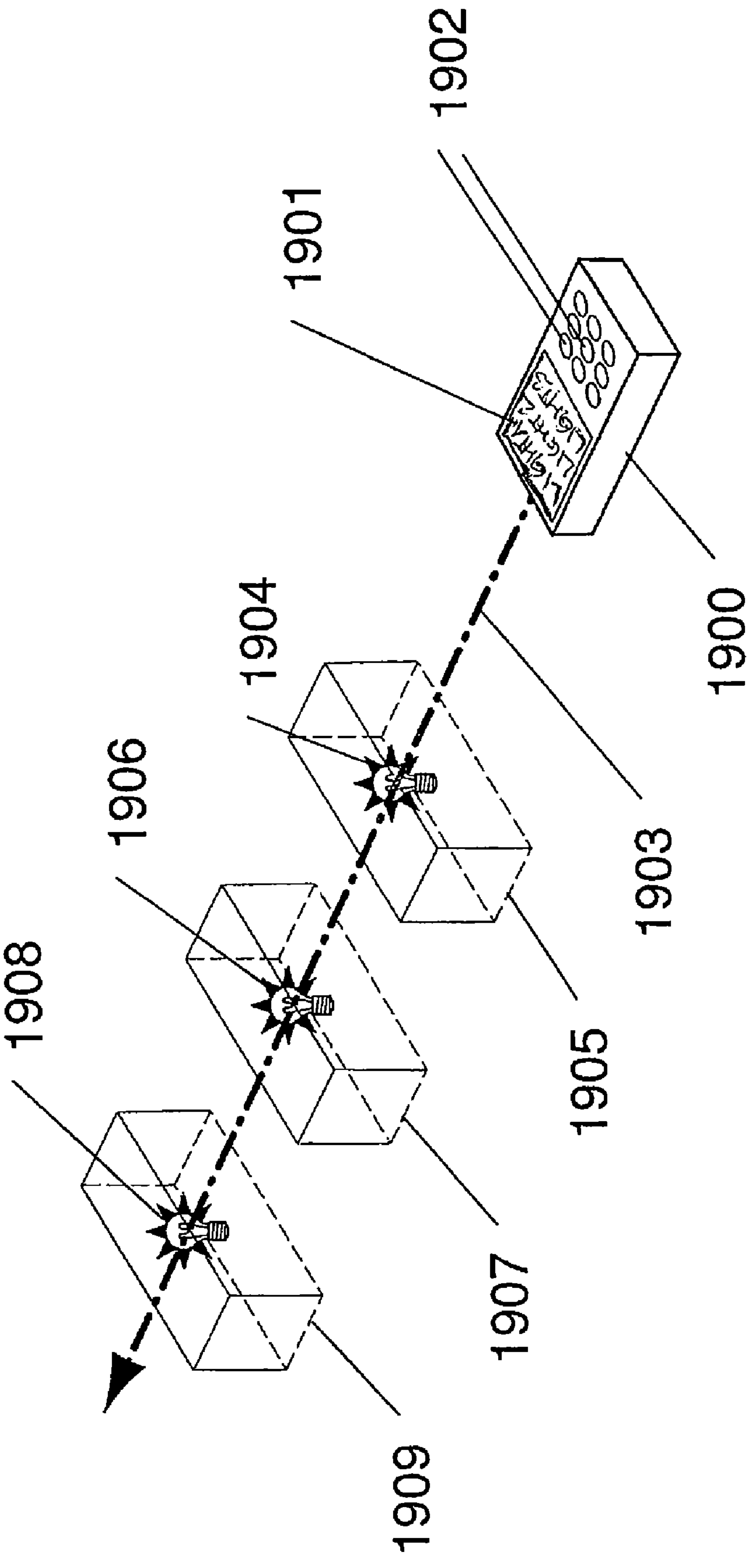
FIG. 19 shows a schematic view of a pointer and several representations intersected by the associated pointer representation.

FIG. 19 shows a schematic depiction of a pointer 1900 having a screen 1901 and operating devices 1902. In the representational space, representations 1905, 1907, 1909 are associated with controllable objects 1904, 1906, 1908 arranged in the real space. The pointer representation 1903 in the representational space associated with the pointer 1900 intersects all three depicted representations 1905, 1907, 1909. Hence, further input is required in order to determine which of the controllable objects 1904, 1906, 1908 the user of the pointer 1900 wishes to control.

In one embodiment, the pointer 1900 depicts a list of the controllable objects 1904, 1906, 1908 or of the associated representations 1905, 1907, 1909 on the screen. The user may now select and control one of the controllable objects 1904, 1906, 1908 listed in the list. Alternatively, the user of the pointer 1900 may select multiple controllable objects 1904, 1906, 1908 listed in the list and commonly control them all. If the controllable objects 1904, 1906, 1908 are e.g. lamps having a controllable brightness, the user of the pointer 1900 may change the brightness of all selected controllable lamps at the same time.

In another embodiment, the selection of one of the objects 1904, 1906, 1908 associated with the representations 1905, 1907, 1909 intersected by the pointer representation 1903 is effected automatically.

For example, the one object 1904 may be selected automatically, the associated representation 1905 of which is closest to the starting point of the pointer representation 1903. Alternatively, the one object 1908 may be selected, the associated representation 1909 of which is furthest away from the starting point of the pointer representation 1903. In another embodiment, the one object 1904, 1906, 1908 may be selected which has been controlled most frequently in the past. In a further embodiment, the one object 1904, 1906, 1908 may be selected automatically which was last controlled in the past. In a further embodiment, the one object 1904, 1906, 1908 may be selected automatically, the associated representation of which comprises the largest intersection volume with the pointer representation.

In order to make the selection of the desired controllable object easier for the user of a pointer, properties of a pointer representation associated with the pointer may be varied automatically or manually by the user of the pointer. Properties of representations associated with controllable objects may also be varied automatically or manually by the user of the pointer.

Figure 20:
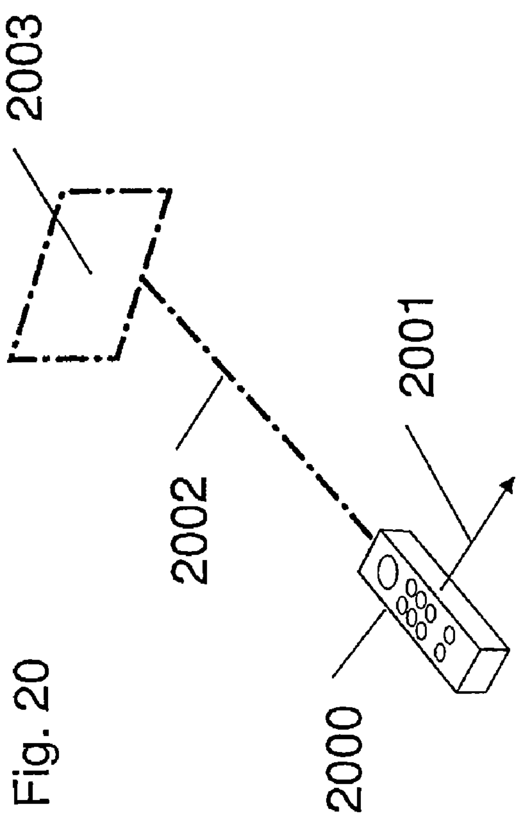
FIG. 20 shows a schematic view of a pointer and an associated pointer representation.

FIG. 20 shows a schematic depiction of a pointer 2000 and of a pointer representation associated with the pointer, the pointer representation having a first part 2002 and a second part 2003. The two-part pointer representation 2002, 2003 corresponds to the two-part pointer representation 1601, 1602 shown in FIG. 16 having a linear first part 2002 and a rectangular second part 2003. The size of the rectangular second part 2003 of the pointer representation may be modified depending on different parameters. For example, the size of the second part 2003 of the pointer representation may be automatically modified depending on a velocity 2001 at which the pointer 2000 is moved through the real space. If the pointer 2000 is moved through the real space at a high velocity 2001, the size of the second part 2003 of the pointer representation will be increased. If the pointer 2000 is moved through the real space at a low velocity, the size of the second part 2003 of the pointer representation will be reduced. The change in size of the second part 2003 of the pointer representation may also be carried out inversely. The size of the second part 2003 of the pointer representation may also be varied automatically depending on environment parameters such as a brightness, a temperature, an air pressure, a time of day etc. The size of the second part 2003 of the pointer representation may also be varied manually by the user of the pointer 2000. Properties of other forms of pointer representations, such as the pointer representations of FIGS. 13 to 18, may also be varied.

Figure 21:
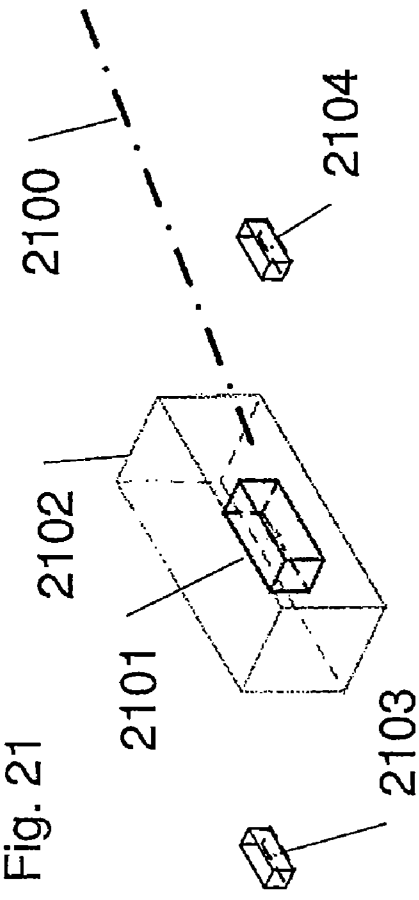
FIG. 21 shows a schematic view of a pointer representation and a plurality of representations.

FIG. 21 shows a schematic depiction of a pointer representation 2100 arranged in the representational space. The pointer representation 2100 intersects a representation 2101 arranged in the representational space. Thereupon, the representation 2101 is automatically enlarged to form a new representation 2102. The enlarged representation 2102 is associated with the same controllable object in the real space as the original representation 2101. Whereas the representation 2101 is enlarged to form representation 2102, other representations 2103, 2104 which are arranged in the representational space and are not intersected by the pointer representation are diminished. Controlling a controllable object associated with the pointer representation 2101 may be made easier for the user of a pointer associated with the pointer representation 2100 by the enlargement of the representation 2101 intersected by the pointer representation 2100 to the enlarged representation 2102 and the diminishment of representations 2103, 2104 which are not intersected by the pointer representation 2100. The enlarged representation 2102 is still intersected by the pointer representation 2100 when the user slightly moves the pointer associated with the pointer representation 2100. Thereby, controlling the object associated with the representation 2102 also remains possible if the pointer is slightly moved.

The enlargement of the representation 2101 to representation 2102 and the diminishment of the representations 2103, 2104 may persist for a predetermined time. The enlargement of representation 2101 to representation 2102 and the diminishment of representations 2103, 2104 may e.g. be reversed when the user has finished controlling the object associated with representation 2101. Alternatively, the enlargement and diminishment of the representations may be reversed after a predetermined period of time.

In another embodiment, controlling a selected controllable object may be facilitated by keeping a selected controllable object selected until the user of the pointer deselects the object. In this embodiment, after the selection of a controllable object, the pointer does not have to remain orientated such that the pointer representation associated with the pointer further intersects the representation associated with the controllable object.

In a further embodiment, a representation intersected by the pointer representation may, in order to facilitate manipulating, be rotated such that a largest surface of the representation faces the starting point of the pointer representation. The rotation of the representation may be reversed after finishing the controlling of an object associated with the representation or after a predetermined period of time.

In a further embodiment, position, orientation and size of representations arranged in a representational space may change automatically depending on time or depending on environmental parameters such as an environmental temperature, a brightness or an air pressure. For example, a representation which is associated with a lamp may automatically be enlarged when it is dark.

In a further embodiment, representations of the representational space may temporarily be removed from the representational space in order to facilitate a controlling of objects whose associated representations are arranged behind the representations to be removed.

The representations may be removed from the representational space automatically or manually by a user of the pointer.

In a further embodiment, controlling a controllable object is carried out depending on the manner in which a representation associated with the object is intersected by a pointer representation associated with the pointer. For example, a setting value of the object may be increased automatically when the representation is intersected in a first direction. The setting value of the object may be reduced automatically when the representation is intersected in a second direction. Alternatively, the manner of the intersection may also have an influence on which of the controllable object's settings may be modified.

Figure 23:
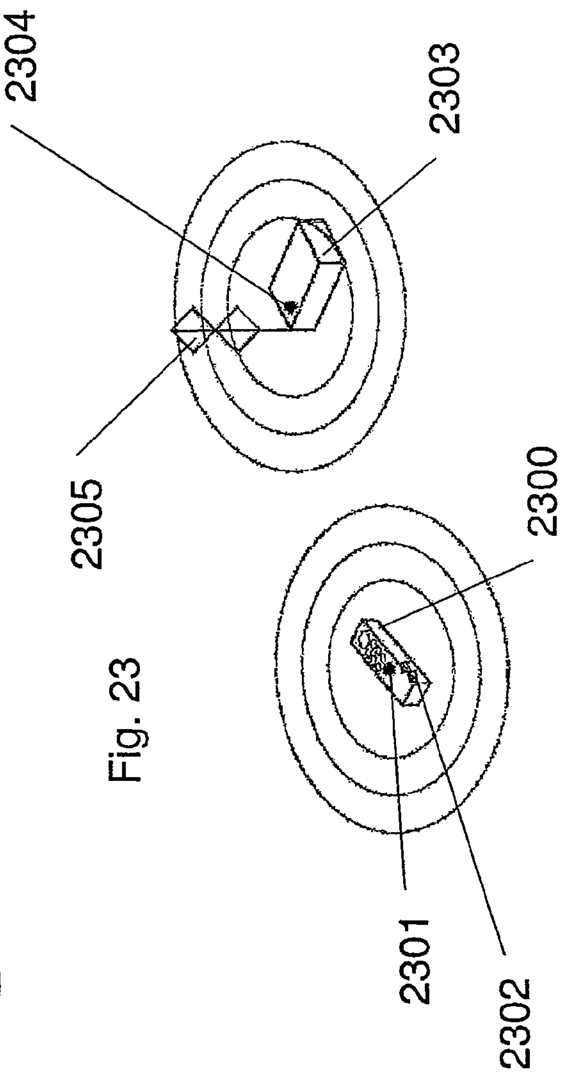
FIG. 23 shows a schematic view of a pointer and a position-detecting system.
Figure 22:
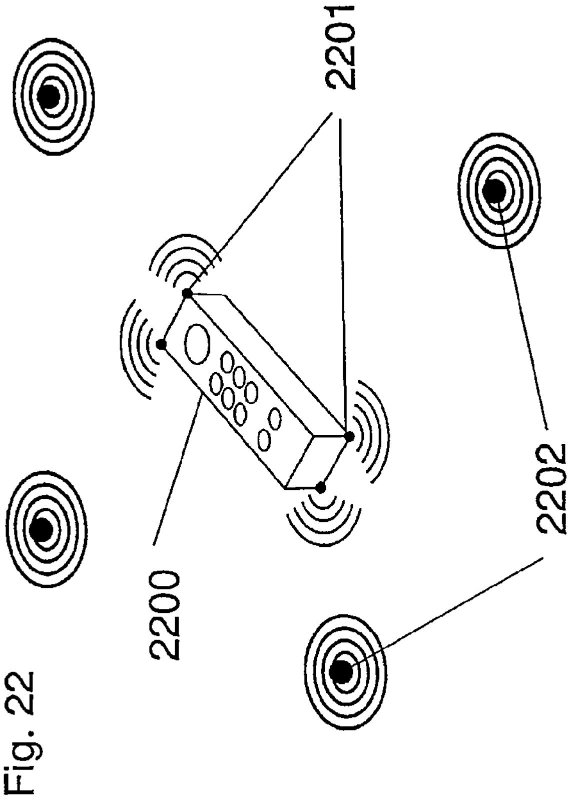
FIG. 22 shows a schematic view of a pointer and a position-detecting system.

FIGS. 22 and 23 exemplify two possibilities for detecting the position and orientation of a pointer in a real space as it is carried out by the position-detecting device 804 shown in FIG. 8.

In FIG. 22, a pointer 2200 is schematically depicted. The pointer 2200 comprises a plurality of transmitters 2201. The transmitters 2201 may e.g. be radio-wave transmitters or ultrasonic-wave transmitters. The real space surrounding the pointer 2200 is provided with a plurality of receivers 2202. The receivers 2202 are configured to detect the signal emitted by the transmitters 2201. The receivers 2202 arranged at various positions in the real space and the transmitters 2201 arranged at various positions of the pointer 2200 allow for detecting the position and orientation of the pointer 2200 in the real space. The detection of the position and orientation of the pointer 2200 may e.g. be carried out by an analysis of the running time of the signals transmitted by the transmitters 2201 and by triangulation.

In FIG. 23, an alternative embodiment of a position-detecting system is schematically depicted. A pointer 2300 is provided with a transmitter 2301 as well as with a receiver 2302. In the real space surrounding the pointer 2300, position-detecting devices 2303 are arranged which comprise both a transmitter 2304 and a receiver 2305. Since in this embodiment, signals are transmitted from the pointer 2300 to the position-detecting devices 2303 and from the position-detecting devices 2303 to the pointer 2300, the precision in detecting position and orientation of the pointer 2300 in the real space is increased.

In other embodiments, position and orientation of a pointer movable in the real space are detected and evaluated by a plurality of cameras arranged in the real space.

In a further embodiment, the position and orientation of a pointer relative to a known starting position and starting orientation of the pointer is detected. For this purpose, the pointer comprises a predetermined known position and orientation at a starting time. Beginning from this starting time, movements of the pointer are recorded and the new position and orientation of the pointer is calculated from the detected movements. The movements of the pointer may e.g. be determined by acceleration sensors and gyration sensors which are integrated in the pointer.

Figure 24:
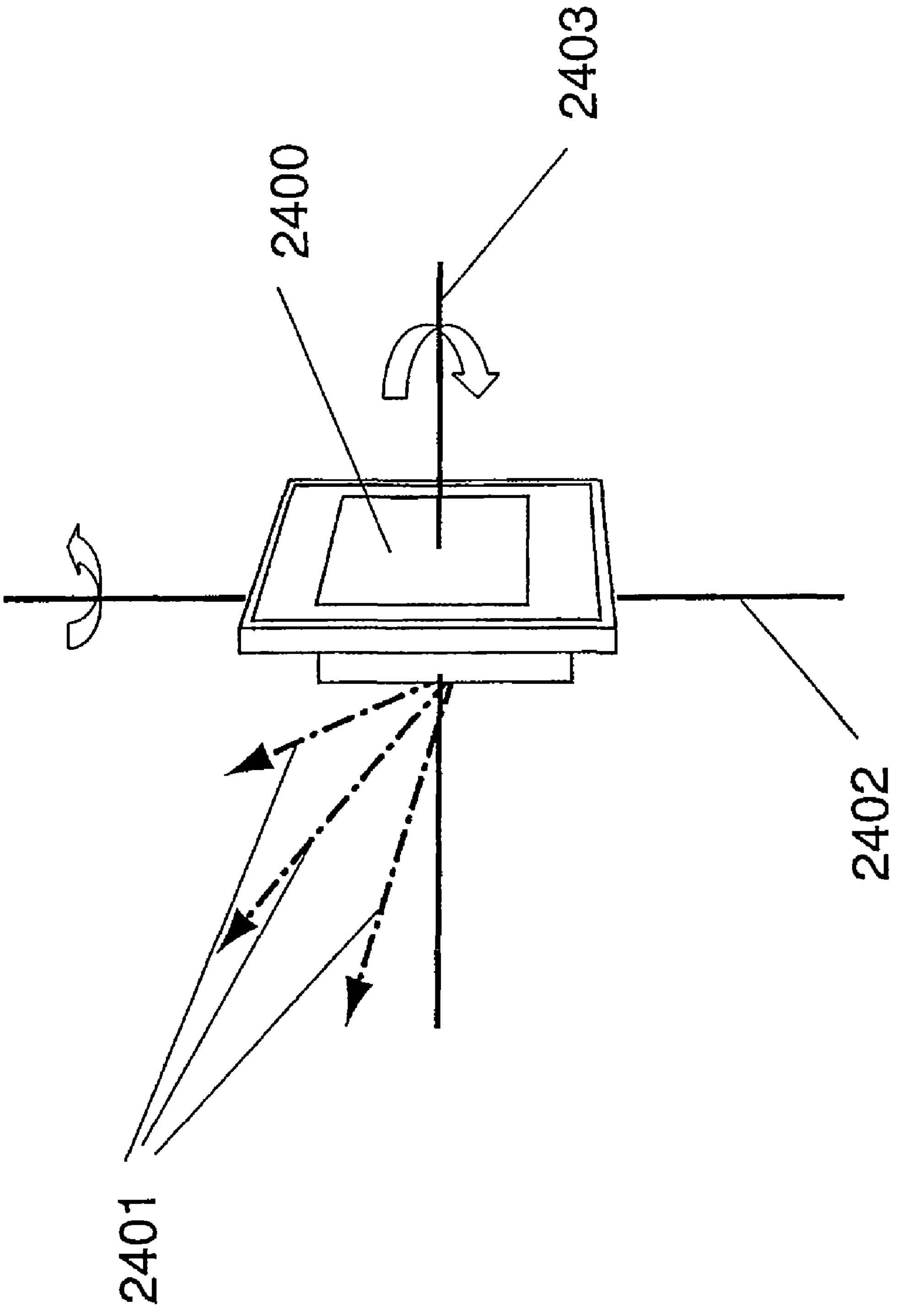
FIG. 24 shows a schematic view of a stationary pointer.

In another embodiment, the pointer comprises a fixed position in the real space. This case is schematically depicted in FIG. 24. A pointer 2400 is arranged in a real space in a stationary manner. In this example the pointer 2400 comprises the shape of a screen. The pointer 2400 is rotatable around a perpendicular axis 2402 and around a horizontal axis 2403. The intersection of the perpendicular axis 2402 and the horizontal axis 2403 lies within the pointer 2400 and always remains at the same point of the real space. A pointer representation 2401 associated with the pointer 2400 in a real space linked to the representational space comprises a determined starting point. Starting from this starting point, the pointer representation 2401 extends into a direction in the representational space which depends on the orientation of the pointer 2400. A rotation of the pointer 2400 around the perpendicular axis 2402 or the horizontal axis 2403 changes the orientation of the pointer representation 2401 in the representational space.

In a further embodiment, a stationary pointer representation is provided in the representational space. In this embodiment, the stationary pointer representation may be activated or deactivated by a user e.g. by a push-button. In another embodiment, the stationary pointer representation is automatically activated or deactivated depending on determined parameters such as an operating temperature of a controllable object or the daytime.

Figure 25:
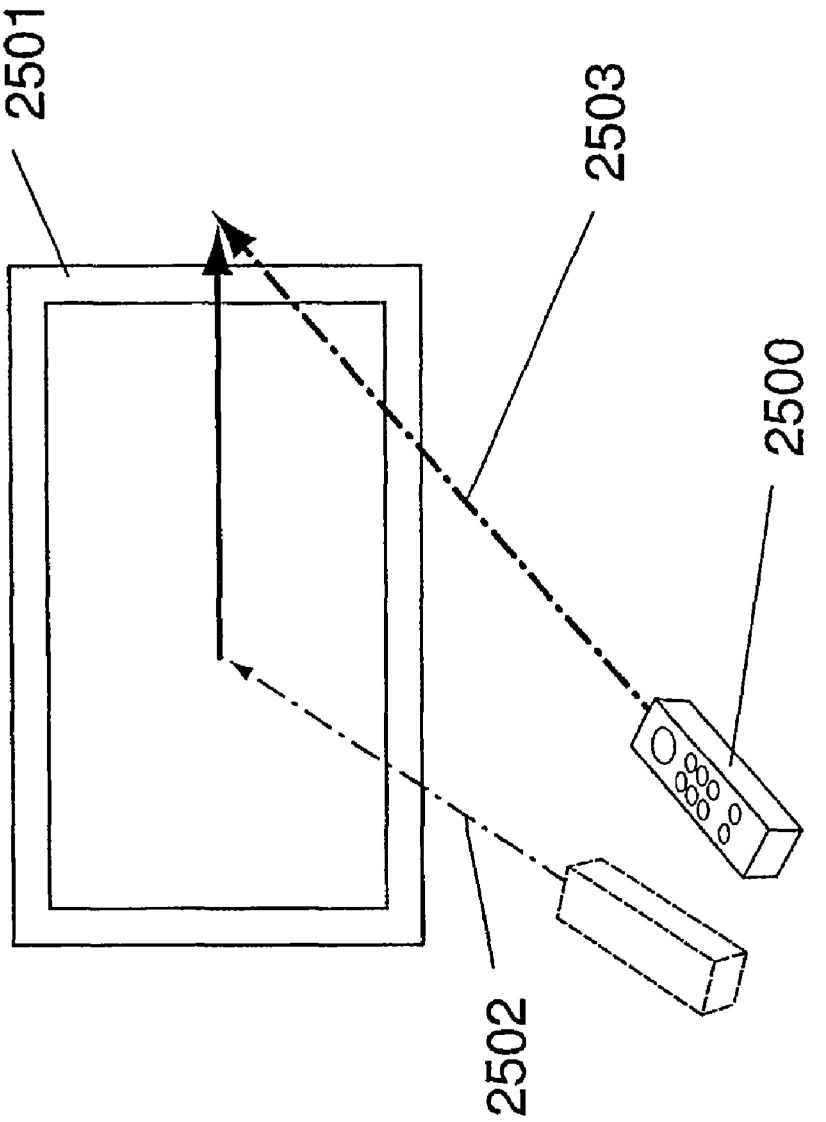
FIG. 25 shows a schematic view of a controllable object and a pointer.

A controllable object which is selected by a pointer may also be controlled by movements of the pointer. This is schematically depicted in FIG. 25. FIG. 25 depicts a pointer 2500 and a controllable object 2501 in a real space. When the pointer 2500 is orientated such that a line of sight 2502 that is perpendicular on a surface of the pointer 2500 intersects the controllable object 2501, then a pointer representation associated with the pointer 2500 intersects a representation associated with the controllable object 2501 in a representational space linked to the real space and the controllable object 2501 is selected for controlling. If the pointer 2500 is rotated or moved into predetermined directions, control commands which depend on the rotation or movement direction are transmitted to the selected controllable object 2501. The controllable object 2501 may e.g. be a TV set. If the pointer 2500 is rotated such that a line of sight 2503 that is perpendicular to a surface of the pointer 2500 streaks the TV set in the direction of the right outer edge of the TV set, the channel shown by the TV set is switched forward by one channel. In this manner, the sound volume of the TV set may e.g. be decreased as well.

If multiple controllable objects arranged in a real space are associated with a representation arranged in a representational space, the multiple controllable objects of the real space may be controlled at the same time. FIG. 4 e.g. shows a representation 403 arranged in a representational space, three controllable objects 400, 401, 402 in a real space being associated with the representation 403. If the representation 403 is intersected by a pointer representation associated with a pointer, all three objects 400, 401, 402 are selected. Control commands which are transmitted by the user by a pointer are transmitted to all three controllable objects 400, 401, 402.

If a plurality of representations arranged in a representational space is combined to form a larger representation, the selection of an associated controllable object may be carried out in a single stage or in two stages. In FIG. 5, representations 501, 503, 505 are associated with the controllable objects 500, 502, 504. The representations 501, 503, 505 are combined to form a larger representation 506. If the pointer representation intersects the representation 506 from a larger distance, the controllable objects 500, 502, 504 are offered for selection to the user of a pointer associated with the pointer representation on a screen of the pointer. If the pointer representation in the representational space intersects the representation 506 as well as exactly one of the representations 501, 503, 505 arranged within the representation 506, the controllable object 500, 502, 504 associated with the intersected representation 501, 503, 505 is directly selected for controlling.

In FIG. 2, a setting representation 202 is arranged in a representational space 200, the setting representation 202 being associated with no controllable object in a real space. Instead, the setting representation 202 represents a set of setting values for one or more controllable objects which are associated with other representations in the representational space. If the setting representation 202 is intersected by a pointer representation, those other controllable objects are set to the setting values represented by setting representation 202. The setting representation 202 may for example represent a combination of determined values for a brightness of a lamp, a temperature of an air conditioning system and an opening state of a sunblind. In order to facilitate intersecting the setting representation 202 with a pointer representation, the setting representation 202 may be arranged in the representational space such that a pointer in the real space associated with the pointer representation has to be orientated to a non-controllable object such as an indoor plant so that the pointer representation associated with the pointer intersects the setting representation 202.

The representations associated with controllable objects may be positioned in a non-overlapping manner or in an overlapping manner in a representational space. A non-overlapping positioning has the advantage that an unambiguous selection of a controllable object associated with the representations is facilitated.

In a further embodiment, a pointer in a real space emits a light beam, for example a laser beam. The light beam proceeds in the real space in a direction which corresponds to the orientation of a pointer representation associated with the pointer in a representational space linked with the real space. This may facilitate handling of the pointer. If the pointer in the real space points at a controllable object, the light beam hits the controllable object and may be perceived as a light spot. This is in particular helpful if a representation associated with the controllable object is arranged in the representational space such that the representation is intersected by the pointer representation when the pointer points at the controllable object.

In a further embodiment, glasses may be provided, onto the transparent spectacle lenses of which an image of a representational space linked to a real space may be projected. If a person wearing these glasses observes the real space, the image of the real space is superimposed by a computer-generated image of the linked representational space with the representations arranged in it. The glasses are for this purpose provided with devices for detecting position and orientation of the glasses in the real space. Depending on position and viewing direction of the wearer of the glasses, an appropriate image of the representational space is generated and projected to the spectacle glasses. The glasses thus allow their wearer to control the positions and orientations of the representations in the representational space.

In a further embodiment, a screen arranged in a real space linked to the representational space is used for the visualization of a representational space. The screen shows a projection of the representational space which, as the case may be, may be diminished from the point of view of an observer arranged at a predetermined position in the representational space. The observer may e.g. be at a position of the representational space which according to the transformation rule between representational space and real space corresponds to a position in the real space which is in front of the screen. A user representation in the representational space may be associated with a user of the pointer who is in the real space. In this case, the user holding the pointer and observing the screen sees the user representation associated with the user, the user representation having a pointer representation associated with the pointer, in a rearward view in the representational space. If the user in the real space moves the pointer, the user representation depicted on the screen carries out a corresponding movement with the pointer representation. For selecting a controllable object, the user in this embodiment may orientate the pointer in the real space such that the pointer representation associated with the pointer intersects a representation in the representational space.

According to a further embodiment, a screen shows an image of a representational space with representations arranged in the representational space. The depiction on the screen is chosen such that an observer of the screen gains the impression that the representational space is arranged behind the screen. The screen may display the complete representational space including all representations which are in it. However, it is also possible that only a part of the representational space is visible. The section may be enlarged, diminished and shifted by an observer of the screen.

The representations arranged in the representational space are associated with controllable objects which may be found in any arbitrary other place than the screen. The screen may e.g. be arranged in an office building, whereas the controllable objects associated with the representations may e.g. be machines arranged in a remote factory building.

The observer of the screen may select various representational spaces. For example, the observer of the screen may switch between representational spaces which are linked to diverse factory buildings.

The real space linked to the representational space in this embodiment comprises both the real space in which the controllable objects are arranged, e.g. the factory building, and the real space in which the screen is arranged, e.g. the office building. In this embodiment, the representations associated with the controllable objects are not at the positions of the representational space which according to the transformation rule between real space and linked representational space correspond to the positions of the controllable objects in the real space. Rather, the representations are arranged at positions in the representational space which lie in the linked real space behind the screen.

In order to control an object associated with a depicted representation, such as a machine in the factory building, the observer of the screen in the real space orientates a pointer in such a way that a line of sight being perpendicular to a surface of the pointer points into a direction behind the screen. The observer thus orientates the pointer to an image of a representation depicted on the screen. Then, a pointer representation associated with the pointer in the representational space intersects the representation and the controllable object associated with the representation is selected for controlling.

The screen may also only depict a section of the representational space. Then, the observer of the screen may also orientate the pointer in the direction of a not-depicted representation, the position of which the observer may estimate based on the representations depicted on the screen.

Further embodiments may result in an obvious manner from a suitable selection of a transformation rule linking a real space to a representational space, a suitable selection of mappings between controllable objects arranged in the real space and representations arranged in the representational space and a suitable selection of a mapping between a pointer arranged in the real space and a pointer representation arranged in the representational space.

A pointer may also be used for shifting representations arranged in a representational space. This may e.g. be used subsequently to the method for defining the representational space described above in FIG. 11 in order to alter the arrangement of the representations in the representational space.

In one embodiment, a pointer representation associated with the pointer in the representational space comprises a predetermined and finite extension. If the pointer is in a shifting mode and is moved in the real space from a position at which the pointer representation associated with the pointer does not intersect a representation in the representational space to a position in the real space at which the pointer representation associated with the pointer does intersect a representation in the representational space, then, if the pointer is again moved in the real space, the intersected representation follows the movement of the pointer representation in the representational space. From this, the user of the pointer gains the impression that the representations in the representational space are shifted by a stick associated with the pointer. The representation may follow the pointer representation until the shifted representation is deselected by the user of the pointer.

The shifting of the representation in the representational space may follow any arbitrary paths in the representational space or proceed along predetermined paths in the representational space.

When approaching the pointer representation to the representation to be shifted in the representational space, an imaginary momentum may be passed from the pointer representation to the representation as it would be the case during a collision of two billiard balls. The size of this virtual impulse depends on the velocity at which the pointer is moved through the real space and at which the pointer representation associated with the pointer is moved through the representational space. The pushed representation is put to motion by the impulse transmittal in the representational space. The movement may take place in a damped manner so that the pushed representation covers a distance in the representational space which depends on the size of the transmitted impulse and then comes to rest. It is thus possible to shoot a representation in the representational space from one position to another. In the context of the above-described visualizations of the representational space by glasses or a screen, this may be used for games.

A pointer may also serve for determining points in a real space. If, for example, a representation in the representational space linked to the real space is associated with a wall of the real space and if the pointer points at a point on the wall, a pointer representation associated with the pointer intersects a point of the representation in the representational space associated with the wall. According to the mapping and the transformation rule, the point on the wall is in turn associated with this point of the representation at which the user has pointed the pointer. The user of the pointer may store the coordinates of this point.

If the user of the pointer has in this manner stored a number of points on the wall, he may e.g. have the size of the surface area enclosed by the points, the distance of two points to each other, or the distance of a point from the pointer indicated on the screen of the pointer. In this way, the user of the pointer may also determine a volume included by the predetermined volume.

If the points determined by the user are on the floor of the real space, the user of the pointer may define a path by the predetermined points. The user of the pointer may use this path for controlling controllable objects. For example, the user may assign this predetermined path to a vacuum cleaner. The vacuum cleaner then follows this predetermined path autonomously.

As described above, one or multiple stationary pointer representations may also be provided in the representational space. If a representation is shifted in a representational space in such a way that it is intersected by a stationary pointer representation, this may provoke predetermined reactions. For example, the controllable object associated with the representation may be switched on as soon as the representation is intersected by the stationary pointer representation.

A first representation may be shifted in the representational space in such a way that it comes into contact with a second representation in the representational space or that it intersects this second representation in the representational space. This may also provoke a predetermined reaction. For example, settings of the controllable object associated with the first representation may be transmitted to the controllable object associated with the second representation. If a representation associated with a first lamp is brought into contact with a representation associated with a second lamp, the second lamp is set to the same brightness as the first lamp.

Further functions may be integrated into the pointer. For example, the pointer may also serve as mobile phone, navigation system, internet client, three-dimensional computer mouse or as display unit for information of all sorts.

The invention claimed is:

1. A method for controlling objects, wherein a real space is linked to a multi-dimensional representational space by an alterable transformation rule, wherein representations in the representational space are associated with the objects to be controlled by an alterable mapping, and wherein, for controlling the objects arranged in the real space, the following steps are carried out:

detecting a position and orientation of a pointer in the real space;

determining a position and orientation of a pointer representation associated with the pointer in the representational space by the position and orientation of the pointer in the real space and by the transformation rule between real space and representational space;

determining the representations in the representational space which are intersected by the pointer representation;

selecting a representation which is intersected by the pointer representation, and controlling the object in the real space which is associated with the pointer representation in the representational space;

wherein a setting representation is arranged in the representational space, wherein one or multiple setting values of one or multiple objects are associated with the setting representation, and wherein the following steps are carried out to set the one or multiple objects to the one or multiple setting values:

detecting the position and orientation of the pointer in the real space;

determining the position and orientation of the pointer representation associated with the pointer in the representational space by the position and orientation of the pointer in the real space and the transformation rule between real space and representational space; and selecting the setting representation and transmitting the one or multiple setting values to the one or multiple objects if the setting representation is intersected by the pointer representation.

2. The method according to claim 1, wherein defining the representational space includes the following steps:

defining a mathematical transformation rule between representational space and real space;

associating representations with the objects to be controlled;

positioning the representations in the representational space.

3. The method according to claim 2, wherein the representations are positioned in the representational space in a non-overlapping manner.

4. The method according to claim 2, wherein the positions and sizes of the representational space and the representations associated with the objects to be controlled are automatically determined according to the positions and sizes of recorded objects to be controlled.

5. The method according to claim 1, wherein the representational space is a two- or three-dimensional representational space.

6. The method according to claim 5, wherein the representations are two- or three-dimensional representations.

7. The method according to claim 1, wherein multiple representations may be combined to form new representations.

8. The method according to claim 1, wherein multiple objects are associated with one representation.

9. The method according to claim 1, wherein from a plurality of representations intersected by the pointer representation, the one representation is selected automatically which has been selected most frequently in the past.

10. The method according to claim 1, wherein a pointer representation is enlarged temporarily.

11. The method according to claim 1, wherein representations may be removed from the representational space temporarily.

12. The method according to claim 1, wherein position, orientation and size of the representations may change depending on temporally alterable parameters.

13. The method according to claim 1, wherein a pointer representation may be moved in the representational space.

14. The method according to claim 1, wherein the following further process steps may be carried out:

associating one or multiple setting values of one or multiple objects with a settings representation; and positioning the settings representation in the representational space.

15. The method according to claim 1, wherein the pointer representation comprises the shape of a cone, a cylinder, a pyramid, a cuboid, a tetrahedron, a prism, a straight line or a fan-shaped line bundle or another geometric shape.

16. The method according to claim 1, wherein the shape of the pointer representation depends on a parameter of the pointer.

17. The method according to claim 1, wherein the shape of the pointer representation may change depending on time-dependent parameters.

18. The method according to claim 1, wherein the pointer emits a light beam into a predetermined direction, wherein the predetermined direction in the real space corresponds to the orientation of the pointer representation in the representational space.

19. The method according to claim 1, wherein controlling the selected object is carried out by conducting predetermined motions with the pointer.

20. The method according to claim 1, wherein controlling the selected object is carried out depending on the manner in which the representation associated with the object is intersected by the pointer representation.

21. The method according to claim 1, wherein the pointer comprises at least one of a predetermined position or orientation in the real space.

22. The method according to claim 1, wherein the pointer representation comprises at least one of a predetermined position or orientation in the representational space.

23. The method according to claim 1, wherein a visualization device is provided for depicting the representational space.

24. A method for controlling objects, wherein a real space is linked to a multi-dimensional representational space by an alterable transformation rule, wherein representations in the representational space are associated with the objects to be controlled by an alterable mapping, and wherein for controlling the objects arranged in the real space, the following steps are carried out:

detecting a position and orientation of a pointer in the real space;

determining a position and orientation of a pointer representation associated with the pointer in the representational space by the position and orientation of the pointer in the real space and by the transformation rule between real space and representational space;

determining the representations in the representational space which are intersected by the pointer representation;

selecting a representation which is intersected by the pointer representation, and controlling the object in the real space which is associated with the pointer representation in the representational space.

25. A method for controlling objects, comprising the following steps:

defining a mathematical transformation rule between a representational space and a real space;

associating representations with the objects to be controlled;

positioning the representations in the representational space;

detecting a position and orientation of a pointer in the real space;

determining a position and orientation of a pointer representation associated with the pointer in the representational space by the position and orientation of the pointer in the real space and by the transformation rule between real space and representational space;

determining the representations in the representational space which are intersected by the pointer representation;

selecting a representation which is intersected by the pointer representation, and controlling the object in the real space which is associated with the pointer representation in the representational space.

* * * * *